US012752671B2

(12) United States Patent
Hayashi et al.

(10) Patent No.: US 12,752,671 B2
(45) Date of Patent: Oct. 6, 2026

(54) SLIDING DEVICE

(71) Applicant: DELTA KOGYO CO., LTD., Hiroshima (JP)

(72) Inventors: Toshinori Hayashi, Hiroshima (JP); Ryo Oniki, Hiroshima (JP); Yuu Inasako, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 130 days.

(21) Appl. No.: 18/854,874

(22) PCT Filed: Mar. 20, 2023

(86) PCT No.: PCT/JP2023/010941

§ 371 (c)(1),
(2) Date: Oct. 7, 2024

(87) PCT Pub. No.: WO2023/210210

PCT Pub. Date: Nov. 2, 2023

(65) Prior Publication Data

US 2025/0353408 A1 Nov. 20, 2025

(30) Foreign Application Priority Data

Apr. 26, 2022 (JP) ................................ 2022-072593

(51) Int. Cl.
*B60N 2/08* (2006.01)
*B60N 2/07* (2006.01)

(52) U.S. Cl.
CPC ......... *B60N 2/0875* (2013.01); *B60N 2/0705* (2013.01); *B60N 2/0818* (2013.01)

(58) Field of Classification Search
CPC .. B60N 2/0875; B60N 2/0705; B60N 2/0818; B60N 2/06; B60N 2/08; B60N 2/0831; B60N 2/0862; B60N 2/0715
(Continued)

(56) References Cited

U.S. PATENT DOCUMENTS 4,725,032 A * 2/1988 Kazaoka ............. B60N 2/0732 384/34
4,813,643 A * 3/1989 Nihei .................. B60N 2/0843 248/419
(Continued)

FOREIGN PATENT DOCUMENTS

JP 5974816 B2 8/2016
JP 2016-188060 A 11/2016
(Continued)

OTHER PUBLICATIONS

Office Action issued in DE 11 2023 002 065.5; mailed by the German Patent and Trademark Office on May 30, 2025.
(Continued)

*Primary Examiner* — Maria E Graber
(74) *Attorney, Agent, or Firm* — Studebaker Brackett PLLC

(57) ABSTRACT

In a sliding device, a sliding device includes a lock mechanism that includes a lock plate having a pair of protrusions protruding in a width direction and a pair of guide parts that restrict shifting of the lock plate in an up-down direction by coming into contact with the pair of protrusions. The guide parts are configured to, in progress of the lock plate moving into a lock teeth zone, restrict the lock plate from shifting upward and toward lock teeth by coming into contact with the protrusions until the lock plate reaches an engageable position where a first lock tooth that is closest to a free zone of the lower rail is engageable with an engaged hole that is closest to the free zone among a plurality of engaged holes of the lock plate, and allow the lock plate to shift upward in the engageable position by releasing the restriction.

10 Claims, 25 Drawing Sheets

(58) Field of Classification Search
USPC ........................................................ 297/344.1
See application file for complete search history.

(56) References Cited

U.S. PATENT DOCUMENTS

| | | | | |
|---|---|---|---|---|
| 6,109,584 | A * | 8/2000 | Garrido | B60N 2/0818 297/344.1 |
| 6,220,642 | B1 * | 4/2001 | Ito | B60N 2/02246 296/65.14 |
| 6,641,104 | B2 * | 11/2003 | Flick | B60N 2/0875 297/344.1 |
| 6,648,292 | B2 * | 11/2003 | Flick | B60N 2/0715 297/344.1 |
| 6,688,574 | B2 * | 2/2004 | Okazaki | B60N 2/0705 248/424 |
| 7,658,360 | B2 * | 2/2010 | Kojima | B60N 2/0818 297/340 |
| 7,758,008 | B2 * | 7/2010 | Kojima | B60N 2/0843 297/344.1 |
| 8,322,677 | B2 * | 12/2012 | Nonomiya | B60N 2/0715 297/344.1 |
| 8,393,591 | B2 * | 3/2013 | Mizuno | B60N 2/0705 248/424 |
| 8,616,515 | B2 * | 12/2013 | Hayashi | B60N 2/0887 296/65.13 |
| 8,967,583 | B2 * | 3/2015 | Stoia | B60N 2/0887 296/65.13 |
| 9,150,125 | B2 * | 10/2015 | Hayashi | B60N 2/0875 |
| 2003/0209930 | A1 * | 11/2003 | Horsfield | B60N 2/0705 297/344.1 |
| 2004/0026975 | A1 * | 2/2004 | Rausch | B60N 2/0715 297/344.1 |
| 2009/0102263 | A1 * | 4/2009 | Kojima | B60N 2/0818 297/344.1 |
| 2010/0320353 | A1 * | 12/2010 | Kojima | F16C 33/40 297/344.1 |
| 2011/0266850 | A1 * | 11/2011 | Sei | B60N 2/0825 297/344.1 |
| 2014/0110553 | A1 | 4/2014 | Hoshihara et al. | |
| 2018/0297491 | A1 | 10/2018 | Fukuda et al. | |
| 2022/0063451 | A1 | 3/2022 | Hwang et al. | |

FOREIGN PATENT DOCUMENTS

| | | | |
|---|---|---|---|
| JP | 6587893 | B2 | 10/2019 |
| KR | 10-2368352 | B1 | 2/2022 |

OTHER PUBLICATIONS

International Search Report issued in PCT/JP2023/010941; mailed May 30, 2023.

* cited by examiner

SLIDING DEVICE

TECHNICAL FIELD

The present invention relates to a sliding device for supporting a seat slidably and locking the seat in a desired position.

BACKGROUND ART

A sliding device having a configuration for supporting a seat slidably in a front-rear direction and locking the seat in a desired position has been conventionally and widely adopted for an automobile seat or other seat.

Such a sliding device has, for example, a structure described in Patent Literature 1. The sliding device includes: a lower rail to be fixedly attached to a floor surface of an automobile in a front-rear direction of a seat; and an upper rail to be fixedly attached to the seat and guided by the lower rail movably in the front-rear direction. The lower rail has a plurality of locking teeth arrayed in a longitudinal direction thereof. The locking teeth protrude downward from a lower edge of an inner wall of the lower rail.

The sliding device includes a locking mechanism in the upper rail for locking the upper rail in a desired position. The locking mechanism includes: a locking plate having a plurality of engagement holes to be engageable with locking teeth; a spring member that urges the locking plate to make the locking plate be engaged with the locking teeth at the lower rail; and an operation lever for moving the locking plate downward and unlocking.

The sliding device maintains the locking plate in a locking position before operation. To lock the seat in a desired position, first, the operation lever is pulled upward to move the locking plate downward against the urging force of the spring member for unlocking. Subsequently, the seat is slid to the desired position, and finally, the operation lever is pulled downward to make the locking plate be engaged with the locking teeth at the lower rail.

A lower rail of such a conventional sliding device includes an inner wall having a zone (or a lock teeth zone) bearing a plurality of continuous lock teeth and another zone (or a free zone) bearing no lock tooth and located adjacent to the front or rear of the lock teeth zone in a longitudinal direction thereof. In this regard, the locking plate has a possibility that not all the engagement holes of the locking plate may fail to be reliably engaged with a plurality locking teeth at the lower rail around a boundary between the lock teeth zone and the free zone at the lower rail.

Here, movement of the conventional sliding device will be described with reference to drawings, i.e., FIG. 22A to FIG. 25B, each schematically illustrating a state of engagement between a plurality of lock teeth 2*e* at a lower rail 2 and a plurality of engaged holes 111*b* of a lock plate 111 that is shiftable upward and downward as in the sliding device described in Patent Literature 1. Specifically, each of FIG. 22A to 25A is a bottom view of the lower rail 2 and the lock plate 111, and each of FIG. 22B to 25B is a front view of the lower rail 2 and the lock plate 111 and illustrates the lock plate 111 in cross-section. The lower rail 2 has two rows of the lock teeth 2*e* arrayed in a longitudinal direction X of the lower rail 2.

As illustrated in FIGS. 22A and 22B, the lower rail 2 has a lock teeth zone TZ bearing the lock teeth 2*e* and a free zone FZ without a lock tooth 2*e*. The lock plate 111 and an upper rail (not shown) are freely slidable in a state where the lock plate 111 is in the free zone FZ and the lock plate 111 is not engaged with the lock teeth 2*e*.

As illustrated in FIG. 23A to FIG. 24B, when the lock plate 111 reaches a first lock tooth from the free zone FZ of the lower rail 2, that is, reaches a first lock tooth 2*e*1 that is closest to the free zone FZ among the lock teeth 2*e* (FIG. 23A, FIG. 23B, and FIG. 24B), the lock plate 111 shifts upward with an urging force of the spring member to lock the seat. As illustrated in FIG. 25A and FIG. 25B, the lock plate 111 may tilt and only a rear end 111*d* of the lock plate 111 is hooked by a second lock tooth 2*e*2 that is adjacent to the first lock tooth 2*e*1, resulting in incomplete locking.

CITATION LIST

Patent Literature

Patent Literature 1: Japanese Patent Publication Number 6587893

SUMMARY OF INVENTION

The present invention has been accomplished in consideration of the circumstances described above, and has an object of providing a sliding device that achieves prevention of incomplete locking in a periphery around a first lock tooth at the lower rail.

To achieve the aforementioned object, a sliding device in the present invention includes: a lower rail that is a long member to be fixedly attached to a mounting surface over which the seat is arranged; an upper rail having a portion to be fixedly attached to the seat, and guided by the lower rail movably in a longitudinal direction of the lower rail; and a lock mechanism that is attached to the upper rail for locking the upper rail in a specific position in the longitudinal direction. The lower rail includes a pair of side walls extending in the longitudinal direction and facing each other, and at least one inner wall located between the pair of side walls and extending in the longitudinal direction. The inner wall has a predetermined lock teeth zone bearing a plurality of lock teeth protruding downward and arrayed in the longitudinal direction, and a free zone located adjacent to the lock teeth zone and extending in the longitudinal direction without a lock tooth. The lock mechanism includes: a lock plate located between the pair of side walls of the lower rail, having a plurality of engaged parts arrayed in the longitudinal direction to be engageable with the lock teeth, and being configured to move together with the upper rail over the free zone and the lock teeth zone in the longitudinal direction; and an urging member that urges the lock plate upward so that the engaged parts are engaged with the lock teeth. The lock plate has at least one pair of protrusions protruding in a width direction perpendicularly intersecting the longitudinal direction respectively from opposite side surfaces of the lock plate that face in the width direction at positions closer to the lock teeth zone on the opposite side surfaces. The sliding device further includes a pair of guide parts that restrict shifting of the lock plate in an up-down direction by coming into contact with the pair of protrusions. The pair of guide parts are configured to, in progress of the lock plate moving from the free zone into the lock teeth zone, restrict the lock plate from shifting upward and toward the lock teeth until the lock plate reaches an engageable position where a first lock tooth that is closest to the free zone among the lock teeth is engageable with an engaged part that is closest to the free zone among the engaged parts of the lock plate, and allow the lock plate to shift upward and toward the lock teeth when the lock plate reaches the engageable position.

BRIEF DESCRIPTION OF DRAWINGS

FIG. 11 includes explanatory views each schematically illustrating a state immediately after a pair of protrusions of the lock plate come into contact with lower surfaces of main sections of a pair of guide parts in progress of the lock plate in FIG. 7 moving from a free zone into a lock teeth zone at the lower rail.

FIG. 12 includes explanatory views each schematically illustrating a state where the pair of protrusions of the lock plate in FIG. 7 are guided horizontally along lower surfaces of the main sections of the pair of guide parts.

FIG. 13 includes explanatory views each schematically illustrating a state where the pair of protrusions of the lock plate in FIG. 7 are guided horizontally along lower surfaces of the main sections of the pair of guide parts.

FIG. 14 includes explanatory views each schematically illustrating a state where the pair of protrusions of the lock plate in FIG. 7 are guided horizontally along lower surfaces of the main sections of the pair of guide parts.

FIG. 15 includes explanatory views each schematically illustrating a state where the pair of protrusions of the lock plate in FIG. 7 are guided obliquely upward over second slope sections of the pair of guide parts, and a rear end portion of the lock plate between the pair of protrusions come into contact with leading ends of the lock teeth.

FIG. 16 includes explanatory views each schematically illustrating a state where the lock plate in FIG. 7 shifts upward and a plurality of engaged holes of the lock plate are engaged with the lock teeth.

FIG. 18 includes explanatory views each schematically illustrating a configuration of another modification of the sliding device in the present invention, the configuration including: a lock plate having a pair of protrusions each having a larger dimension in a longitudinal direction and a pair of guide parts each having a smaller dimension in the longitudinal direction and located closer to a first lock tooth.

FIG. 20 includes explanatory views each schematically illustrating a configuration of still another modification of the sliding device in the present invention, the configuration including: a lock plate having a pair of protrusions each having a larger dimension in a longitudinal direction, and a pair of additional protrusions; and a pair of guide parts each having a smaller dimension in the longitudinal direction and located closer to a first lock tooth.

FIG. 22 includes explanatory views each schematically illustrating incomplete locking of a lock plate in a conventional sliding device.

FIG. 23 includes explanatory views each schematically illustrating incomplete locking of the lock plate in the conventional sliding device.

FIG. 24 includes explanatory views each schematically illustrating incomplete locking of the lock plate in the conventional sliding device.

FIG. 25 includes explanatory views each schematically illustrating incomplete locking of the lock plate in the conventional sliding device.

DESCRIPTION OF EMBODIMENTS

Hereinafter, a sliding device according to an embodiment of the present invention will be described in detail with reference to the accompanying drawings.

A pair of sliding devices 1 are adopted in a state of, for example, being arranged under a seat S for a vehicle (hereinafter, referred to as the "seat S") illustrated in FIG. 1 at a predetermined distance between the devices in a width direction (a direction perpendicular to the paper of FIG. 1) of the seat S. Alternatively, the pair of sliding devices 1 may be arranged at a predetermined distance therebetween in a front-rear direction (X-direction) to extend in the width direction of the seat S. The seat S in FIG. 1 has a structure with a seatback S1 (or a backrest) standing upward from a rear end portion of a seat cushion S2. However, the structure of the seat S in the present invention is not particularly limited.

Figure 1:
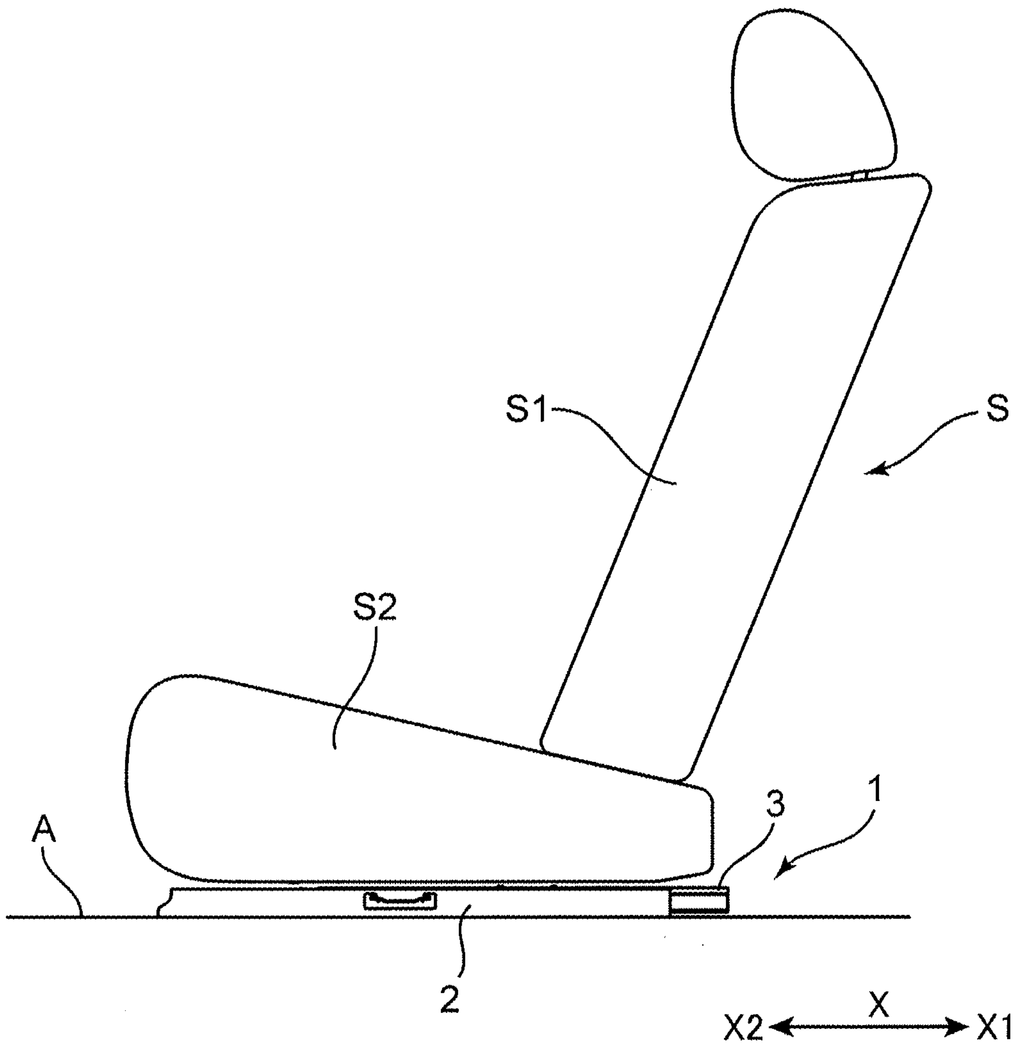
FIG. 1 is a front view of a configuration of a sliding device attached to a lower surface of a seat, according to an embodiment of the present invention.
Figure 2:
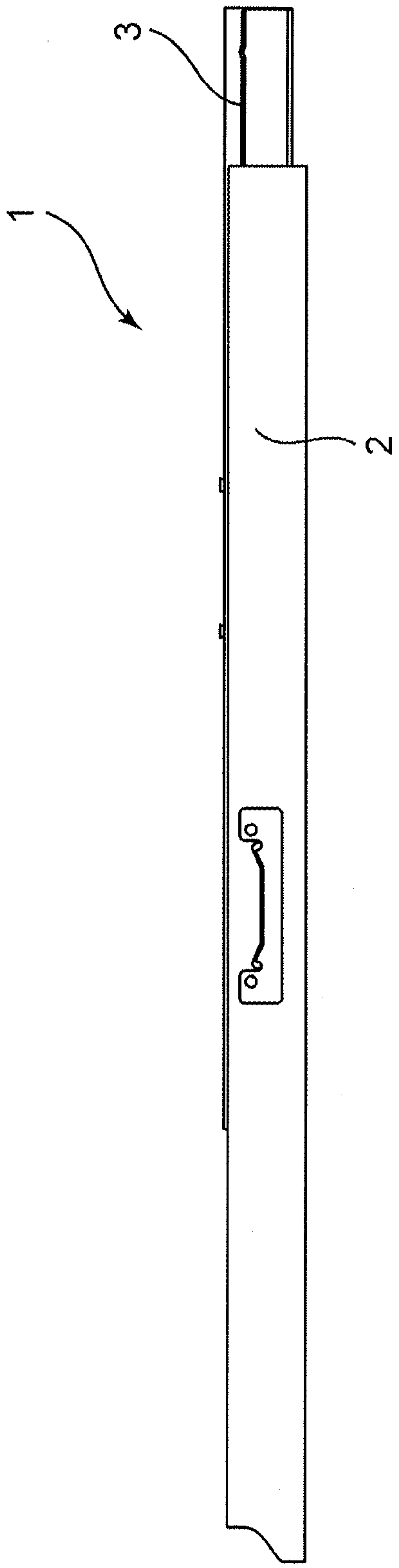
FIG. 2 is a front view of the sliding device in FIG. 1.
Figure 3:
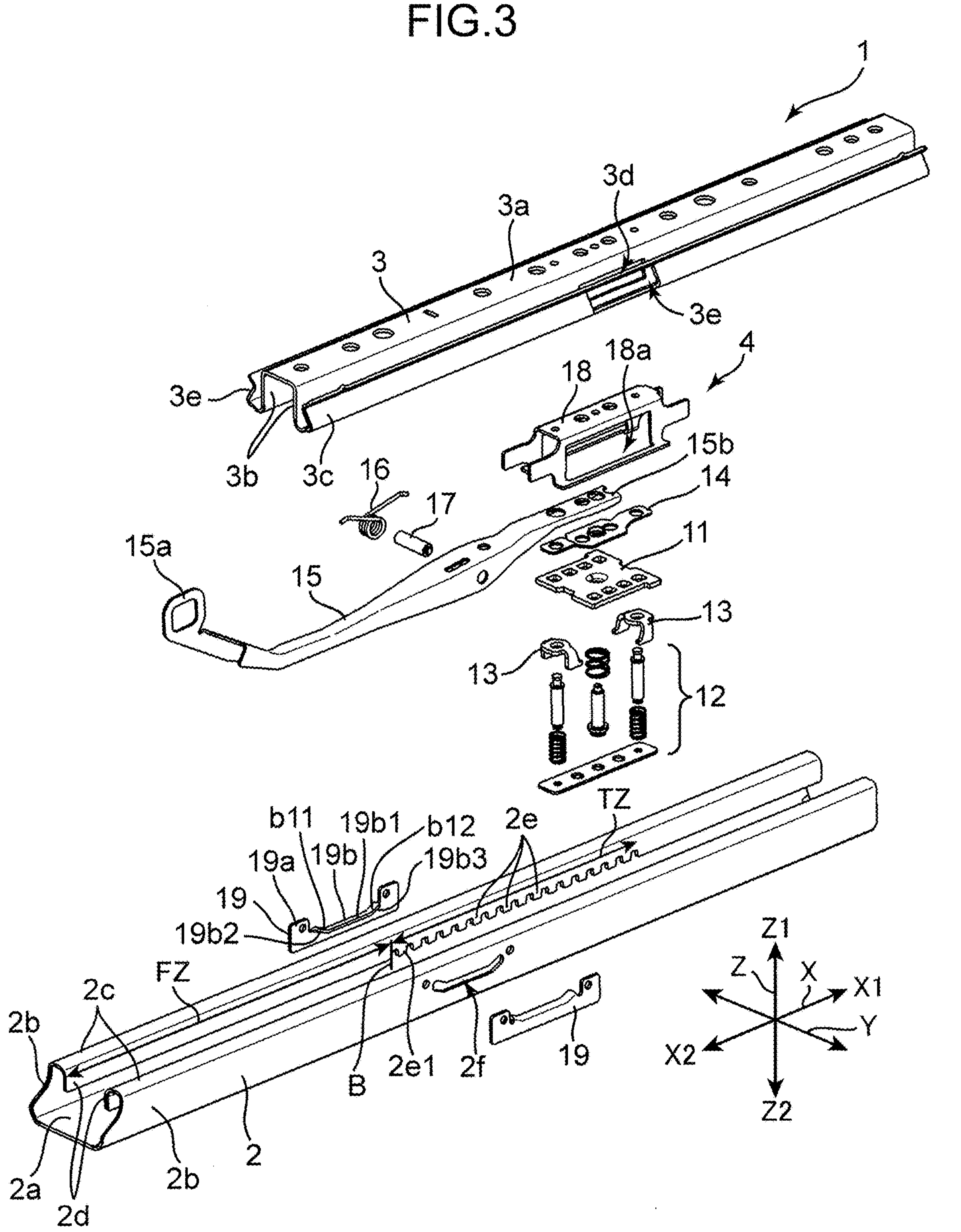
FIG. 3 is an exploded perspective view of the sliding device in FIG. 2.

As illustrated in FIG. 1 to FIG. 3, each sliding device 1 includes: a lower rail 2 that is a long member to be fixedly attached to a mounting surface A over which the seat S is arranged; an upper rail 3 having a portion to be fixedly attached to a lower portion of the seat cushion S2, and guided by the lower rail 2 movably in a longitudinal direction X of the lower rail 2; a lock mechanism 4 including the lock plate 11; and a pair of guide brackets 19 having a pair of guide parts 19*b*.

Figure 4:
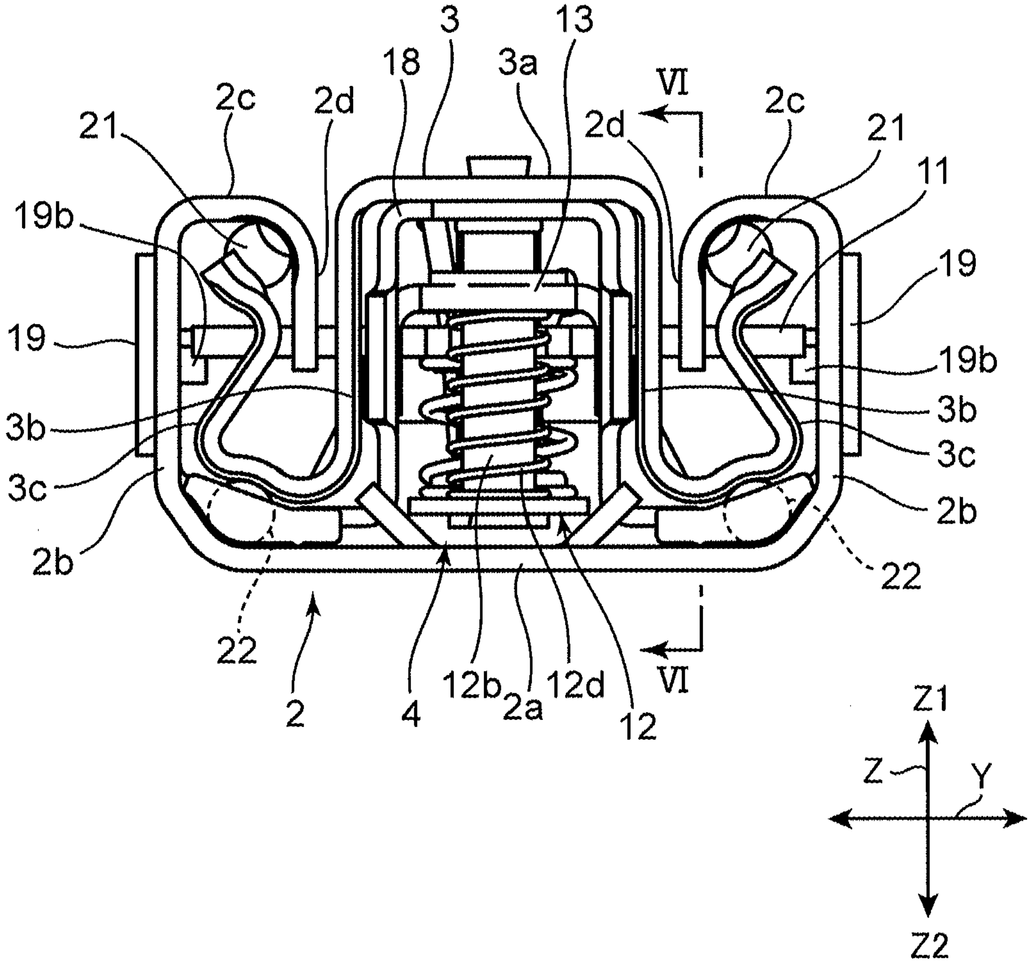
FIG. 4 is a right side view of the sliding device in FIG. 2.

As illustrated in FIG. 3 to FIG. 4, the lower rail 2 includes a pair of side walls 2*b* extending in the longitudinal direction X and facing each other, and at least one inner wall 2*d* (a pair of inner walls in the embodiment) located between the pair of side walls 2*b* and extending in the longitudinal direction X. Specifically, the lower rail 2 in the embodiment includes a bottom wall 2*a* having a bottom surface to come into contact with the mounting surface A, the pair of side walls 2*b* standing upward from the opposite ends of the bottom wall 2*a* and facing each other, a pair of upper walls 2*c* bent inward from respective upper edges of the side walls 2*b* at a distance between facing edges of the upper walls, and a pair of inner walls 2*d* bent downward from respective inner edges of the upper walls 2*c* to form a substantially U-shape opening upward in cross-section in a width direction Y perpendicularly intersecting the longitudinal direction X.

Figure 7:
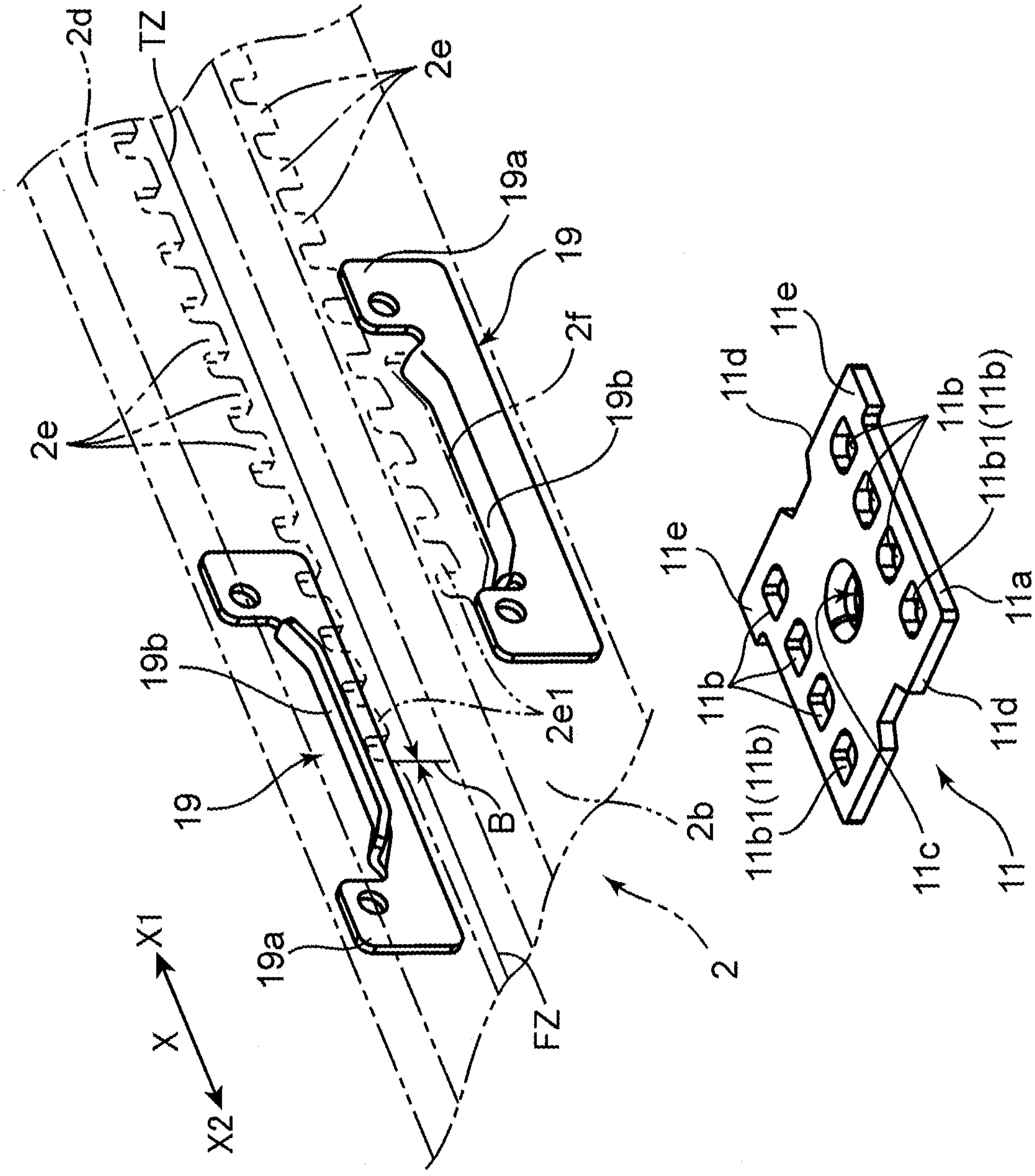
FIG. 7 is an explanatory perspective view of arrangement of guide brackets in FIG. 3, together with main components of a lock plate and of each of the guide brackets.
Figure 8:
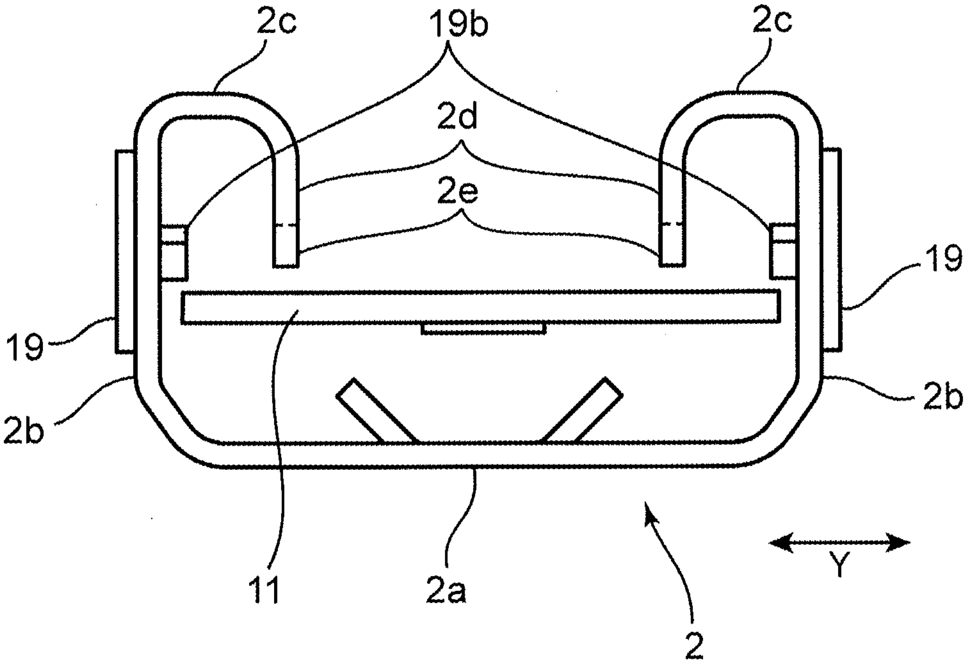
FIG. 8 is an explanatory view illustrating arrangement of the lock plate and the guide brackets at a lower rail in a right side view of a lower rail in FIG. 3.

The sliding device 1 in the embodiment has a configuration applicable to a walk-in sliding device that can slide the seat S rearward X1 to a large extent. In this configuration, each of the pair of inner walls 2*d* has a predetermined lock teeth zone TZ and a predetermined free zone FZ being adjacent to each other in the longitudinal direction X as illustrated in FIG. 3 and FIG. 7. The lock teeth zone TZ bears a plurality of lock teeth 2*e* protruding downward Z2 and arrayed in the longitudinal direction X. In contrast, the free zone FZ extends frontward X2 from the lock teeth zone TZ (i.e. continuous from the lock teeth zone TZ) adjacent thereto in the longitudinal direction X without a lock tooth 2*e*. The lock teeth 2*e* (i.e., the lock teeth zone TZ) may be provided to at least one of the pair of inner walls 2*d*.

Each of portions of the pair of side walls 2*b* of the lower rail 2 corresponding to a periphery around a first lock tooth that includes a boundary between the free zone FZ and the lock teeth zone TZ in the longitudinal direction X, that is, a portion corresponding to a periphery around a first lock tooth 2*e*1 that is closest to the free zone FZ among the lock teeth 2*e*, has a long hole 2*f* penetrating the side wall 2*b* and extending in the longitudinal direction X. In the embodiment, as illustrated in FIG. 3 and FIG. 7, the long hole 2*f* is located in a range covering: a boundary B between the free zone FZ and the lock teeth zone TZ; and a region of four lock teeth 2*e* including the first lock tooth 2*e*1 (see the four lock teeth 2*e* corresponding to four engaged holes 11*b* of the lock plate 11 illustrated in FIG. 11A to FIG. 16B) in the longitudinal direction X.

As illustrated in FIG. 3 to FIG. 4, the upper rail 3 includes an upper wall 3*a* and a pair of side walls 3*b* bent downward from the opposite ends of the upper wall 3*a* and facing each other to form a substantially U-shape opening downward in cross-section in the width direction Y. The upper rail 3 further includes a pair of bent parts 3*c* bent outward and upward from respective lower ends of the pair of side walls 3*b*. The upper rail 3 is arranged with each of the bent parts 3*c* located between the associated side wall 2*b* of the lower rail 2 and the associated inner wall 2*d* to face the side wall 2*b*.

Balls 21, 22 each serving as a rolling member as illustrated in FIG. 4 are arranged between the lower rail 2 and the upper rail 3 to allow the upper rail 3 to slide in the longitudinal direction X relative to the lower rail 2 to be fixedly attached to the mounting surface A.

The lock mechanism 4 is attached to the upper rail 3 for locking the upper rail 3 in a specific position in the longitudinal direction X. As illustrated in FIG. 3 to FIG. 8, the lock mechanism 4 may be configured to include at least the lock plate 11 and a lock plate spring 12*c* (or an urging member).

As illustrated in FIG. 5 to FIG. 8, the lock plate 11 is a plate member to be located inside the lower rail 2 and having a plurality of engaged holes 11*b* serving as engaged parts arrayed in the longitudinal direction X and being engageable with the lock teeth 2*e* serving as engaging parts. The lock plate 11 has a substantially quadrangular shape in a plan view. Specifically, the lock plate 11 expands in the longitudinal direction X and the width direction Y (i.e., expands horizontally), and lies in parallel to the bottom wall 2*a* of the lower rail 2 and the upper wall 3*a* of the upper rail 3. More specifically, the lock plate 11 has a pair of side surfaces 11*a* extending in the longitudinal direction X and facing in the width direction Y, and a pair of longitudinal end edge surfaces 11*d* extending in the width direction Y and facing in the longitudinal direction X. The engaged holes 11*b* are arrayed in two rows respectively along the pair of side surfaces 11*a* in the longitudinal direction X. An interval between adjacent engaged holes 11*b* in the longitudinal direction X is defined to agree with an interval between adjacent lock teeth 2*e* in the longitudinal direction X of the lower rail 2. Besides, each engaged hole 11*b* has such a dimension as to receive corresponding one of the lock teeth 2*e* to be inserted therein.

The lock plate 11 has a pair of protrusions 11*e* protruding in the width direction Y respectively from the opposite side surfaces 11*a* at positions closer to the lock teeth zone TZ on the side surfaces 11*a* in the width direction Y (i.e., at an end of the lock plate 11 located rearward X1 in the embodiment). Each protrusion 11*e* is not necessarily located at an extreme end, and may be at any position near an end in a moving direction without a particular limitation under no involvement of incomplete locking of the lock plate 11. Note here that modifications for a change in the position or the shape of the protrusion 11*e* will be described in detail in Modifications (F) and (G) later.

The lock plate spring 12*c* is an urging member that urges the lock plate 11 upward Z1 so that the engaged holes 11*b* of the lock plate 11 are engaged with the lock teeth 2*e*.

Specifically, as illustrated in FIG. 3 to FIG. 8, the lock mechanism 4 in the embodiment includes: the lock plate 11; a lock mechanism support member 12 including the lock plate spring 12*c*; a pair of wedge structural members 13; a release plate 14; and an unlocking manipulation member 15. The lock mechanism 4 is fixed to the upper rail 3 via an upper bracket 18 illustrated in FIG. 3. In this manner, the lock plate 11 is movable together with the upper rail 3 over the free zone FZ and the lock teeth zone TZ in the longitudinal direction X.

The upper bracket 18 is a member having a substantially U-shape in cross-section in the width direction Y, and is fixed to the upper wall 3*a* and the opposite side walls 3*b* of the upper rail 3 inside the upper rail 3.

The upper bracket 18 has opposite side surfaces (in the width direction Y) each having an opening 18*a* penetrating therethrough at an appropriate position as illustrated in FIG. 3, and each of the side walls 3*b* and each of the bent parts 3*c* of the upper rail 3 respectively have openings 3*d*, 3*e* penetrating therethrough to meet the opening 18*a*. The pair of side surfaces 11*a* of the lock plate 11 are disposed in the upper bracket 18 to protrude outward through the openings 3*d*, 3*e* associated with the side surfaces 11*a*. This allows the engaged holes 11*b* of the lock plate 11 arrayed in the two rows to be engaged with the lock teeth 2*e* at the pair of inner walls 2*d* of the lower rail 2.

Each of the lock teeth 2*e* at the lower rail 2 preferably has a tapered shape with a width decreasing downward. This prevents a gap from coming into existence between each lock tooth 2*e* and each engaged hole 11*b* in locking, resulting in suppression of rattling.

Figure 5:
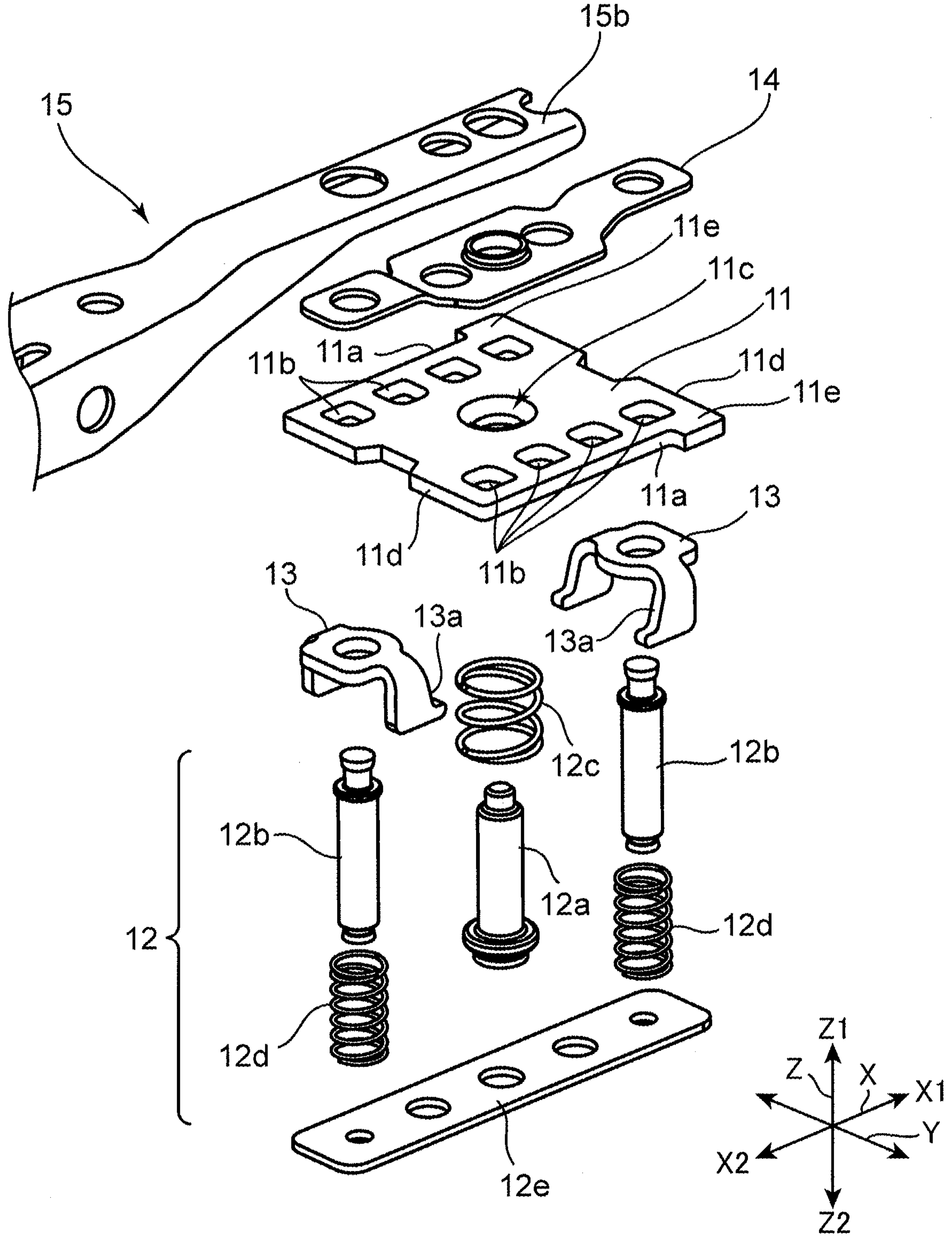
FIG. 5 is an exploded perspective view of a lock mechanism in FIG. 3.

As illustrated in FIG. 5, the lock mechanism support member 12 has a base plate 12*e*, a lock plate guide shaft 12*a* extending upward from the base plate 12*e* and penetrating an upper surface of the upper bracket 18, and a pair of wedge guide shafts 12*b* located away from each other at a predetermined distance across the lock plate guide shaft 12*a* in the longitudinal direction X of the upper rail 3 and protruding upward in the same manner as the lock plate guide shaft 12*a*.

The base plate 12*e* is fixed to lower portions of the side surfaces of the upper bracket 18 in such a manner that the lock plate 11, the wedge structural members 13, the release plate 14, and the unlocking manipulation member 15 are disposed between the base plate 12*e* and the upper surface of the upper bracket 18.

The lock plate 11 is arranged to receive the lock plate guide shaft 12*a* in a guide hole 11*c* penetrating the lock plate 11 at the center thereof. The lock plate guide shaft 12*a* has a periphery to which the lock plate spring 12*c* configured to urge the lock plate 11 toward the upper surface of the upper bracket 18 (i.e., upward Z1) is attached. Each of the pair of wedge guide shafts 12*b* has a periphery to which a wedge spring 12*d* (to be described later) configured to urge the associated wedge structural member 13 upward Z1 is attached.

Figure 6:
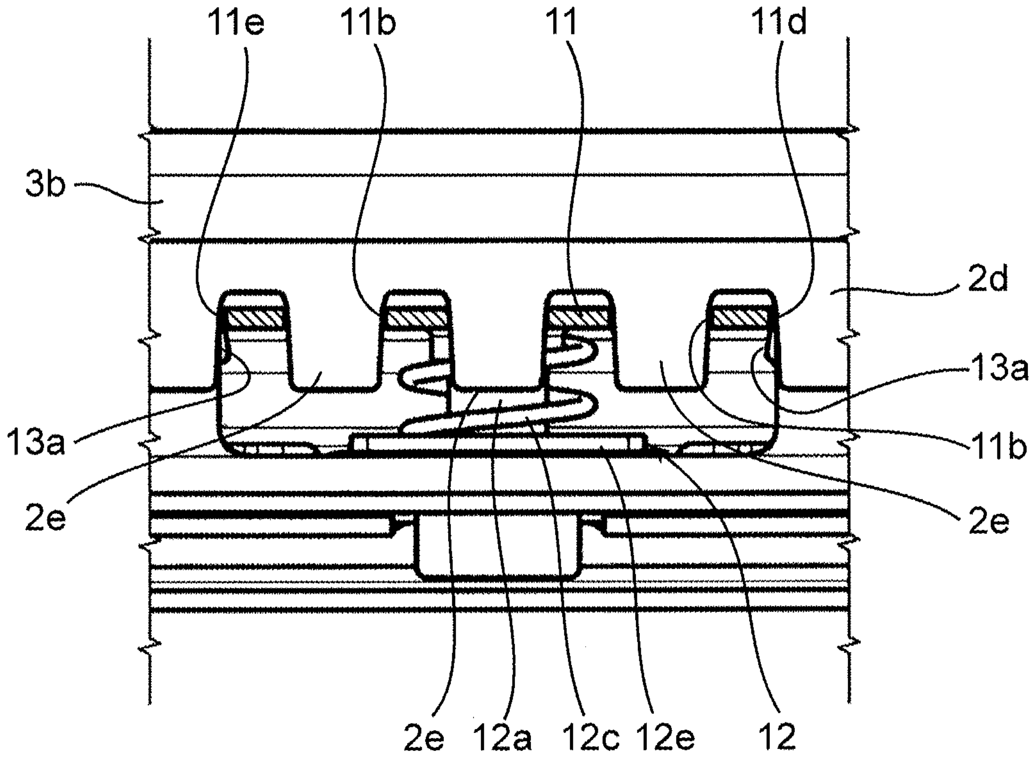
FIG. 6 is a cross-sectional view taken along the line VI-VI in FIG. 4.

The pair of wedge structural members 13 have a pair of slopes 13*a* sloping to approach each other in the longitudinal direction X as advancing downward Z2 (see FIG. 5 to FIG. 6). The pair of slopes 13*a* come into contact with the pair of longitudinal end edge surfaces 11*d* facing in the longitudinal direction X of the lock plate 11 at relatively downward Z2 positions to thereby exert a wedge operational effect of pressing the longitudinal end edge surfaces 11*d* of the lock plate 11 inward from the opposite sides in a side view. This results in restricting the lock plate 11 from shifting downward Z2.

Each of the wedge structural members 13 has a through hole penetrating in the up-down direction, and the through hole receives the associated wedge guide shaft 12*b* inserted therein. The wedge structural members 13 can exert the aforementioned wedge operational effect when urged upward Z1 by the wedge springs 12*d*.

The release plate 14 has a plurality of through holes penetrating in the up-down direction. The through holes respectively receive the lock plate guide shaft 12*a* and the pair of wedge guide shafts 12*b* inserted therein.

The unlocking manipulation member 15 has a predetermined length and is located inside the upper rail 3. The unlocking manipulation member 15 has a front end 15*a* protruding from a front end of the upper rail 3 and connected to a grip part (not shown) that is manipulatable upward and downward by an operator, and a rear end 15*b* having a plurality of through holes that receive the lock plate guide shaft 12*a* and the pair of wedge guide shafts 12*b* inserted therein. The rear end 15*b* is located between the upper surface of the upper bracket 18 and the release plate 14. The unlocking manipulation member 15 is supported to be swingable about a shaft 17 (see FIG. 3) fixed to the pair of side walls 3*b* of the upper rail 3, and the rear end 15*b* is urged upward Z1 by a helical torsion spring 16 in a rotation direction (or a counterclockwise direction around the shaft 17 in FIG. 3). When the front end 15*a* of the unlocking manipulation member 15 shifts upward or downward, the rear end 15*b* shifts in the opposite direction. In other words, when an occupant pulls the grip part upward at unlocking, the front end 15*a* of the unlocking manipulation member 15 shifts upward Z1 and the rear end 15*b* shifts downward Z2 along the lock plate guide shaft 12*a* and the pair of wedge guide shafts 12*b* in response to the pulling. As a result, the release plate 14 located below the rear end 15*b* is also pushed downward, and the lock plate 11 located further below is pushed downward to enable the unlocking.

As illustrated in FIG. 3 to FIG. 4 and FIG. 7 to FIG. 8, the pair of guide brackets 19 having a pair of guide parts 19*b* are respectively located at portions of the pair of side walls 2*b* of the lower rail 2 each corresponding to the periphery around the first lock tooth 2*e*1 that includes the boundary between the free zone FZ and the lock teeth zone TZ in the longitudinal direction X among the lock teeth 2*e*.

Specifically, each guide bracket 19 in the embodiment is member having a plate shape and attached to a region of an outer surface of each of the pair of side walls 2*b* of the lower rail 2, the region including the long hole 2*f* in the longitudinal direction X. The guide bracket 19 has a bracket main part 19*a* and the guide part 19*b*, and is integrally made of a metal plate or other material. The bracket main part 19*a* has a flat shape to be fixed to the outer surface of corresponding one of the pair of side walls 2*b* of the lower rail 2 by welding or other way.

The guide parts 19*b* restrict shifting of the lock plate 11 in the up-down direction Z by coming into contact with the protrusions 11*e* of the lock plate 11 in progress of the lock plate 11 moving from the free zone FZ into the lock teeth zone TZ. Each guide part 19*b* structurally extends in the longitudinal direction X and protrudes inward in the width direction Y of the lower rail 2. In the embodiment, the guide part 19*b* constitutes a portion of the guide bracket 19 that bends inward in the width direction Y of the lower rail 2 and extends along the long hole 2*f* in the longitudinal direction X to be in the long hole 2*f*.

Hence, the guide part 19*b* is located at the portion corresponding to the periphery around the first lock tooth 2*e*1 among the lock teeth 2*e* that includes the boundary between the free zone FZ and the lock teeth zone TZ in the longitudinal direction X of the lower rail 2. Specifically, as illustrated in FIG. 11B, the guide part 19*b* is located in the range covering: the boundary B between the free zone FZ and the lock teeth zone TZ; and the region of the four lock teeth 2*e* including the first lock tooth 2*e*1 (the number of lock teeth 2*e* corresponding to the four engaged holes 11*b* of the lock plate 11) in each row in the longitudinal direction X.

Figure 9:
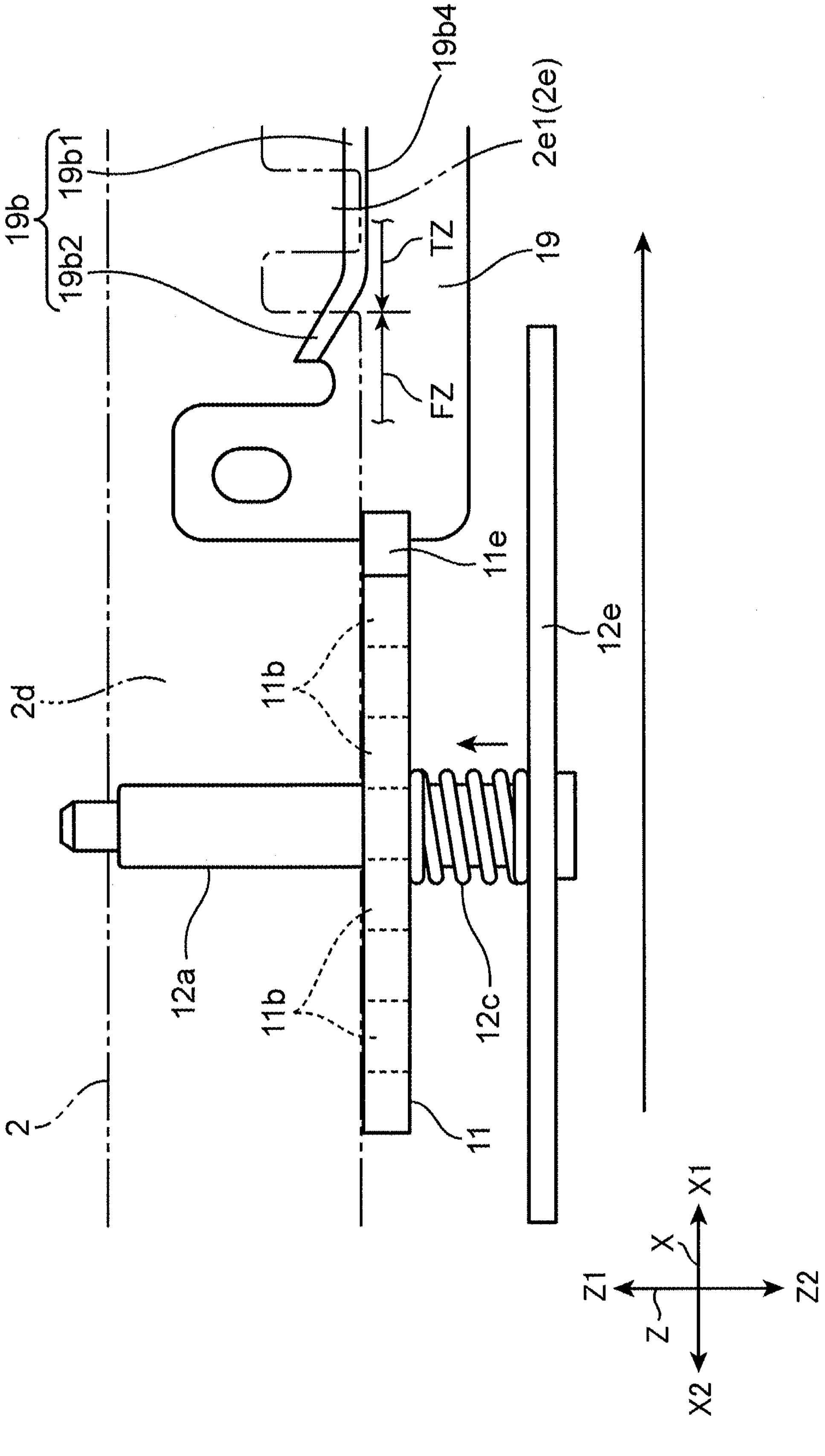
FIG. 9 is a side view schematically illustrating a state before the lock plate in FIG. 7 comes into contact with a guide part of the guide bracket.

More specifically, as illustrated in FIG. 3, FIG. 7, and FIG. 9, the guide part 19*b* has a main section 19*b*1 extending in the longitudinal direction X and having a lower surface 19*b*4 to come into contact with the associated protrusion 11*e*, a first slope section 19*b*2 being continuous to a first end b11 (see FIG. 3) of the main section 19*b*1 that is closer to the free zone FZ and sloping upward Z1 as advancing frontward X2 and away from the main section 19*b*1 in the longitudinal direction X, and a second slope section 19*b*3 being continuous to a second end b12 (see FIG. 3) of the main section 19*b*1 that is closer to the lock teeth zone TZ and sloping upward Z1 as advancing rearward X1 and away from the main section 19*b*1 in the longitudinal direction X.

The guide part 19*b* preferably has a length which is equal to or longer than a portion of the engaged holes 11*b* in the lock plate 11 as illustrated in FIG. 15 and FIG. 16 to ensure prevention of incomplete locking of the lock plate 11.

Figure 11A:
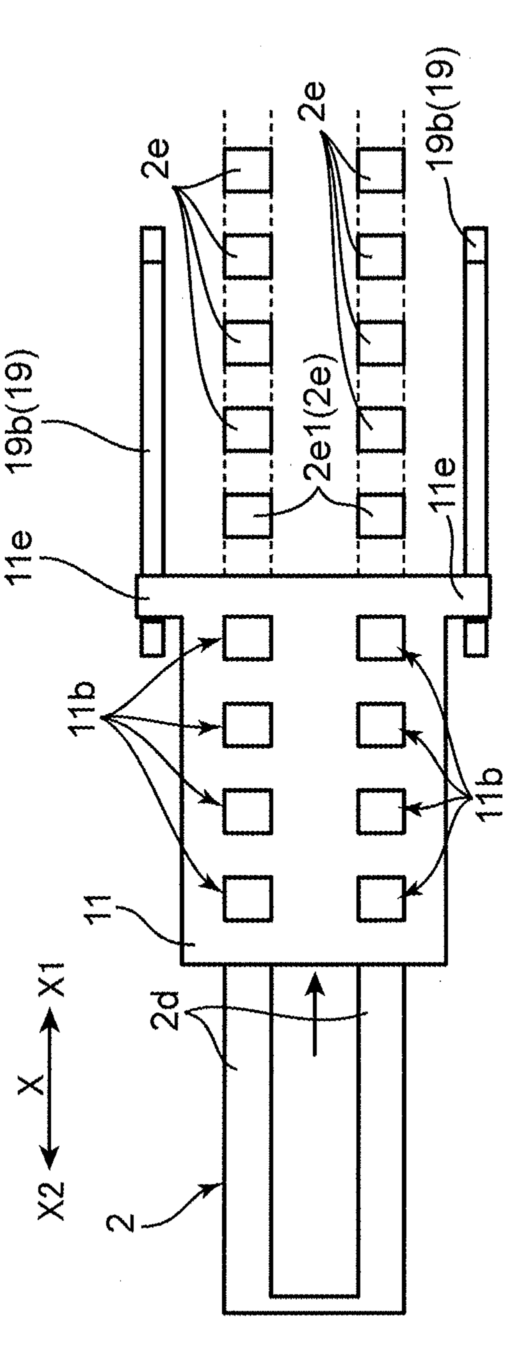
FIG. 11A is a bottom view of the lower rail, the lock plate, and the guide brackets.
Figure 11B:
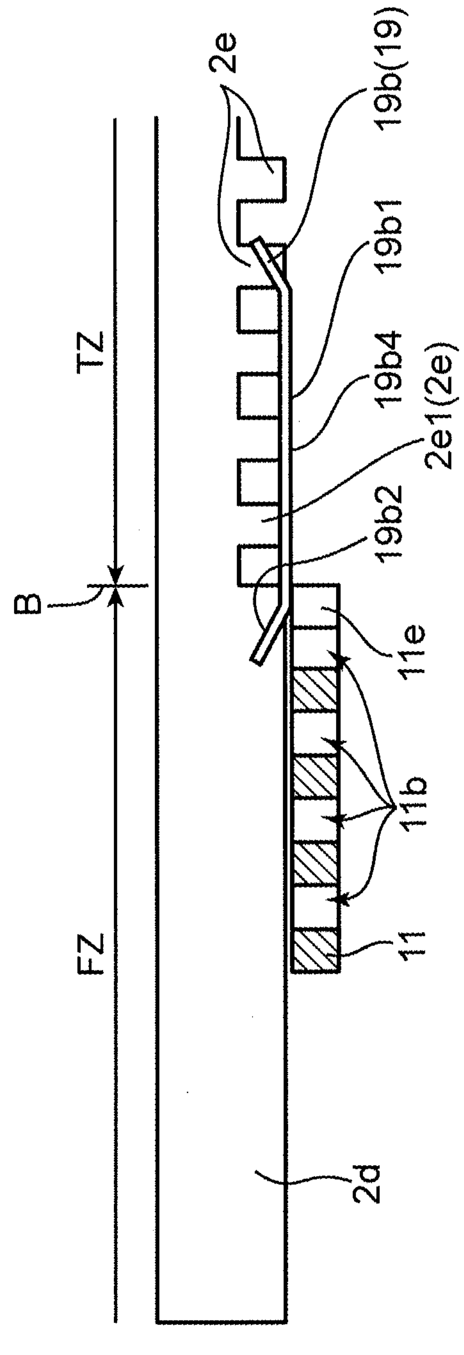
FIG. 11B is a front view of these elements with the lock plate seen in-cross section.
Figure 12A:
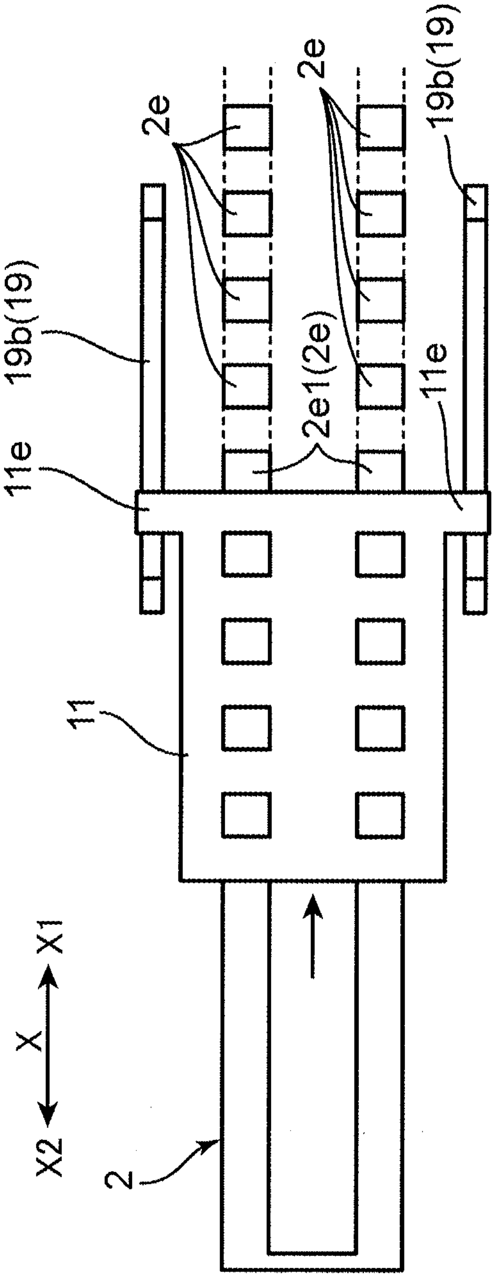
FIG. 12A is a bottom view of the lower rail, the lock plate, and the guide brackets.
Figure 12B:
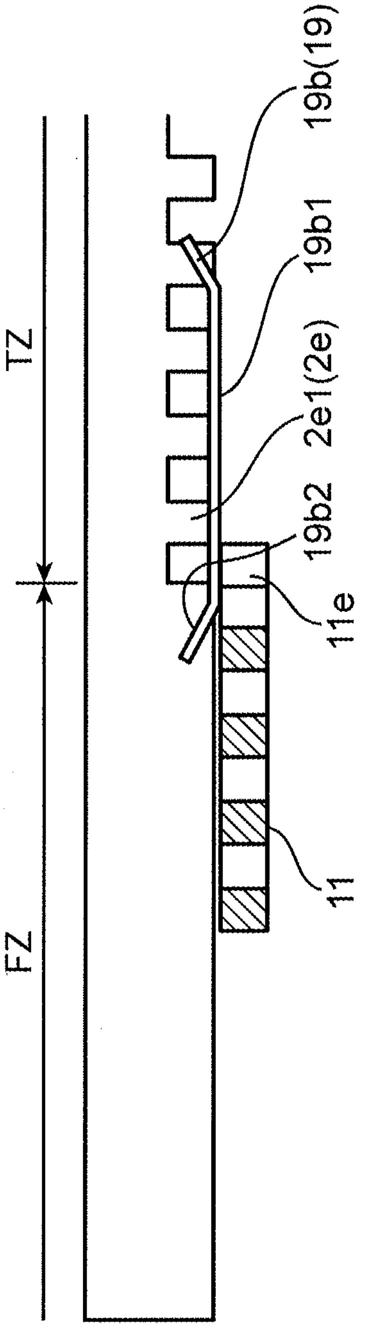
FIG. 12B is a front view of these elements with the lock plate seen in-cross section.
Figure 13A:
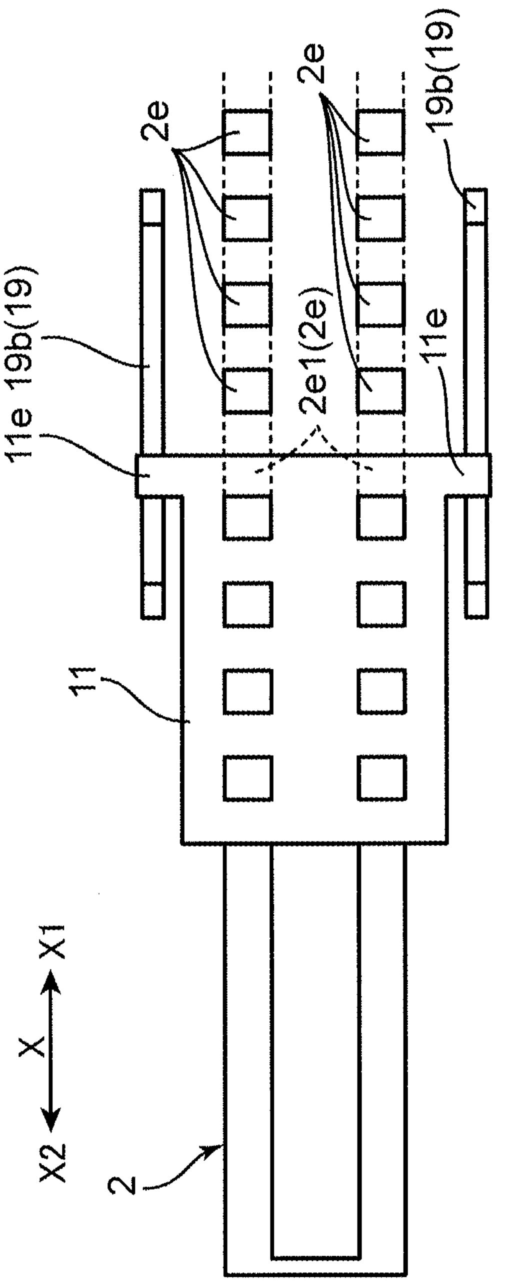
FIG. 13A is a bottom view of the lower rail, the lock plate, and the guide brackets.
Figure 13B:
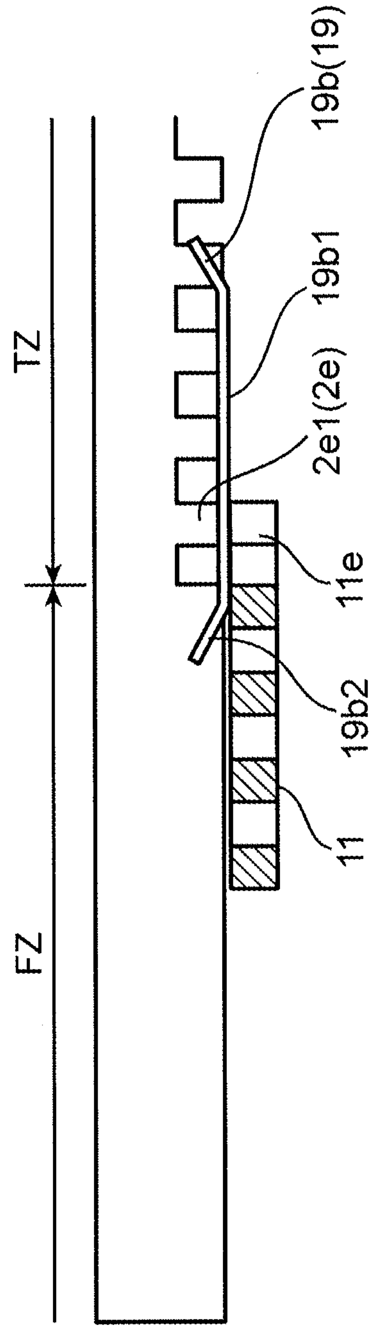
FIG. 13B is a front view of these elements with the lock plate seen in-cross section.
Figure 14A:
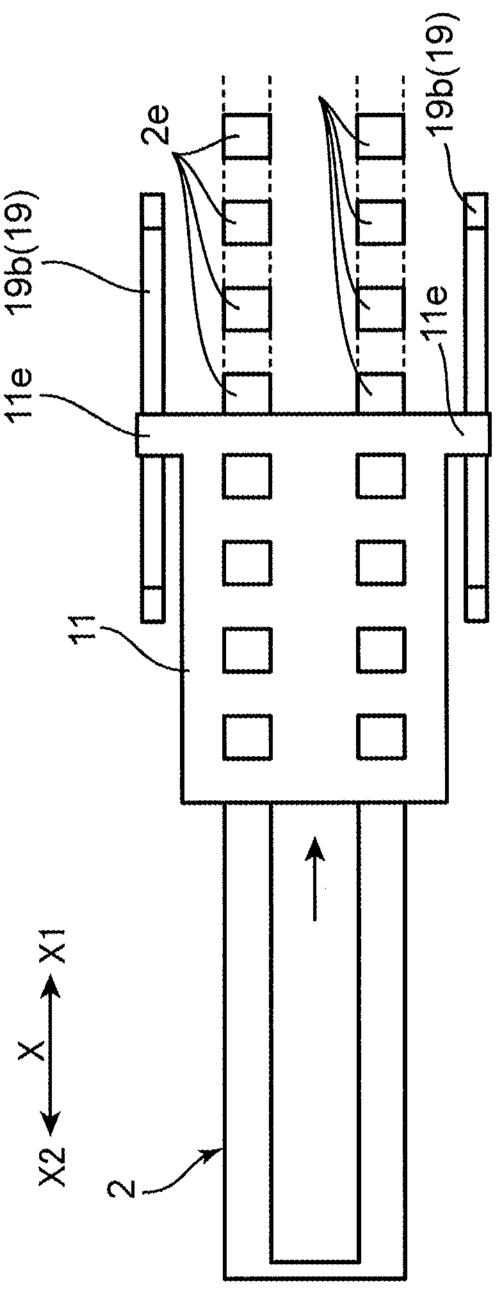
FIG. 14A is a bottom view of the lower rail, the lock plate, and the guide brackets.
Figure 14B:
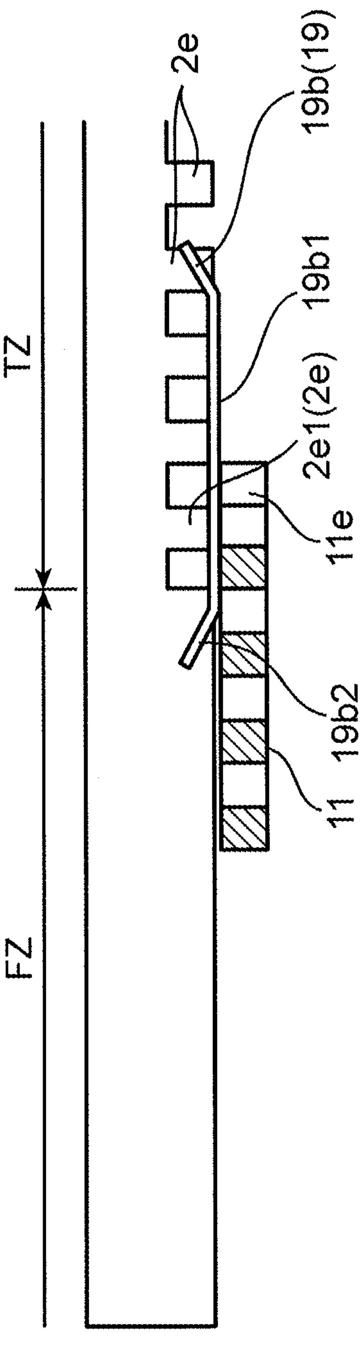
FIG. 14B is a front view of these elements with the lock plate seen in-cross section.

Moreover, the lower surface 19*b*4 of the main section 19*b*1 of the guide part 19*b* extending in the longitudinal direction X is preferably at a height which is equal to or lower than a height of leading ends of the lock teeth 2*e* as illustrated in FIG. 11B to ensure prevention of incomplete locking of the lock plate 11.

To achieve smooth locking of the lock plate 11 while preventing such incomplete locking, the length and the position of each of the guide parts 19*b* in the longitudinal direction X are preferably defined to allow a portion of the lock plate 11 between the pair of protrusions 11*e* to come into contact with the leading ends of the lock teeth 2*e* and then allow the lock plate 11 to shift upward with an urging force of the lock plate spring 12*c* and reach a locking position where the lock teeth 2*e* engage with the engaged holes 11*b*, after the guide parts 19*b* release the restriction, that is, when each of the protrusions 11*e* shifts from a contact position for contact with the associated guide part to a non-contact position for no contact with the guide part. In the embodiment, to attain this definition condition, the length and the arrangement of the guide part 19*b* are defined as to cover the region having: the boundary B between the free zone FZ and the lock teeth zone TZ; and the four lock teeth 2*e* including the first lock tooth 2*e*1 (the number of lock teeth 2*e* corresponding to the four engaged holes 11*b* of the lock plate 11).

Explanation for an Operation of the Sliding Device 1

The sliding device 1 slides the upper rail 3 rearward X1 along the lower rail 2. At this time, as illustrated in FIG. 9, the lock plate 11 in the lock mechanism 4 at the upper rail 3 is movable rearward X1 without being locked in the free zone FZ bearing no lock tooth 2*e* at each inner wall 2*d* of the lower rail 2. Specifically, the lock plate 11 is slidable rearward X1 while being in contact with a lower end of the inner wall 2*d* with an urging force acting upward Z1 from the lock plate spring 12*c*.

As illustrated in FIG. 10 to FIG. 16B, in progress of the lock plate 11 moving from the free zone FZ into the lock teeth zone TZ, the lower surfaces 19*b*4 of the pair of guide parts 19*b* restrict the lock plate 11 from shifting upward Z1 and toward the lock teeth 2*e* by coming into contact with the upper surfaces of the pair of protrusions 11*e* of the lock plate 11 until the lock plate 11 reaches an engageable position where the first lock tooth 2*e*1 that is closest to the free zone FZ among the lock teeth 2*e* is engageable with an engaged hole 11*b* that is closest to the free zone FZ among the engaged holes 11*b* of the lock plate 11. When the pair of protrusions 11*e* of the lock plate 11 pass over respective rear ends of the pair of guide parts 19*b* and the lock plate 11 reaches the engageable position, the pair of guide parts 19*b* allow the lock plate 11 to shift upward Z1 and toward the lock teeth 2*e* by releasing the restriction.

Figure 25A:
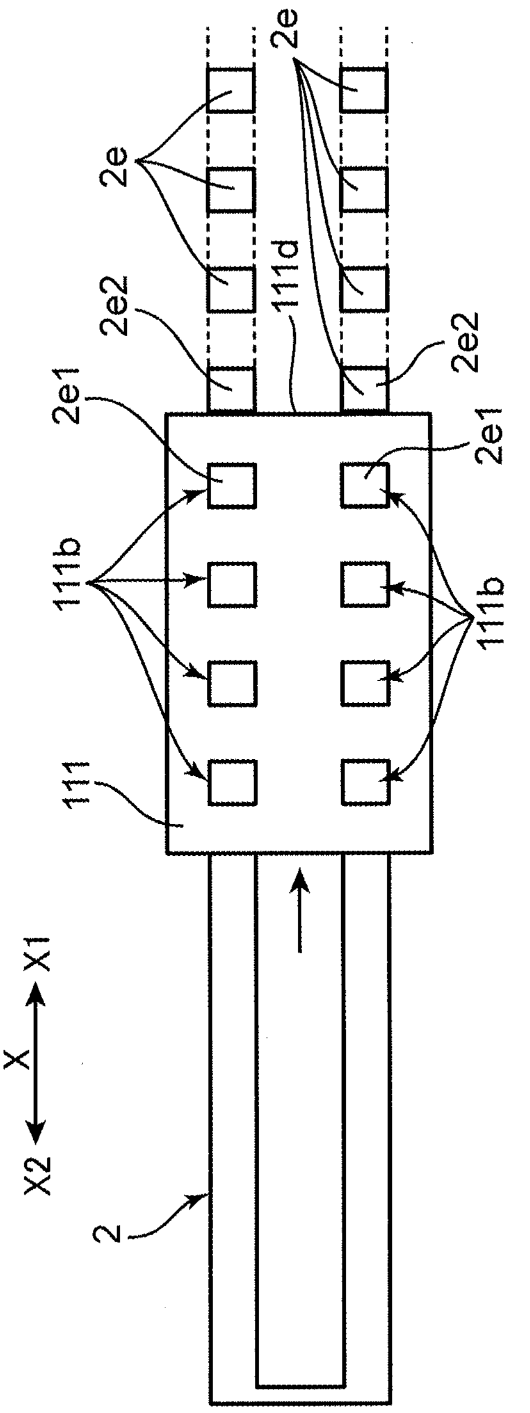
FIG. 25A is a bottom view of the lower rail and the lock plate.
Figure 25B:
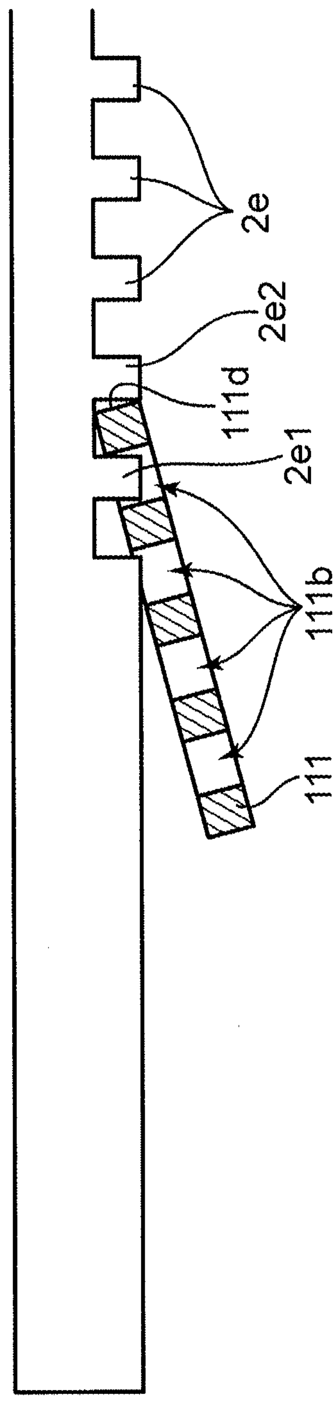
FIG. 25B is a front view of these elements with the lock plate seen in-cross section.

In other words, after the pair of protrusions 11*e* at a rear end of the lock plate 11 located rearward X1 pass over the guide parts 19*b* and reach a position where the lock plate 11 is properly lockable, the lock plate 11 shifts upward while staying horizontal, and the four lock teeth 2*e* including the first lock tooth 2*e*1 respectively engage with the four engaged holes 11*b*. This configuration enables locking of the upper rail 3 in the periphery around the first lock tooth 2*e*1 and achieves prevention of incomplete locking (i.e., such locking that the lock plate 11 tilts as illustrated in FIG. 25A and FIG. 25B).

The movement of the lock plate 11 will be described in detail below.

Figure 10:
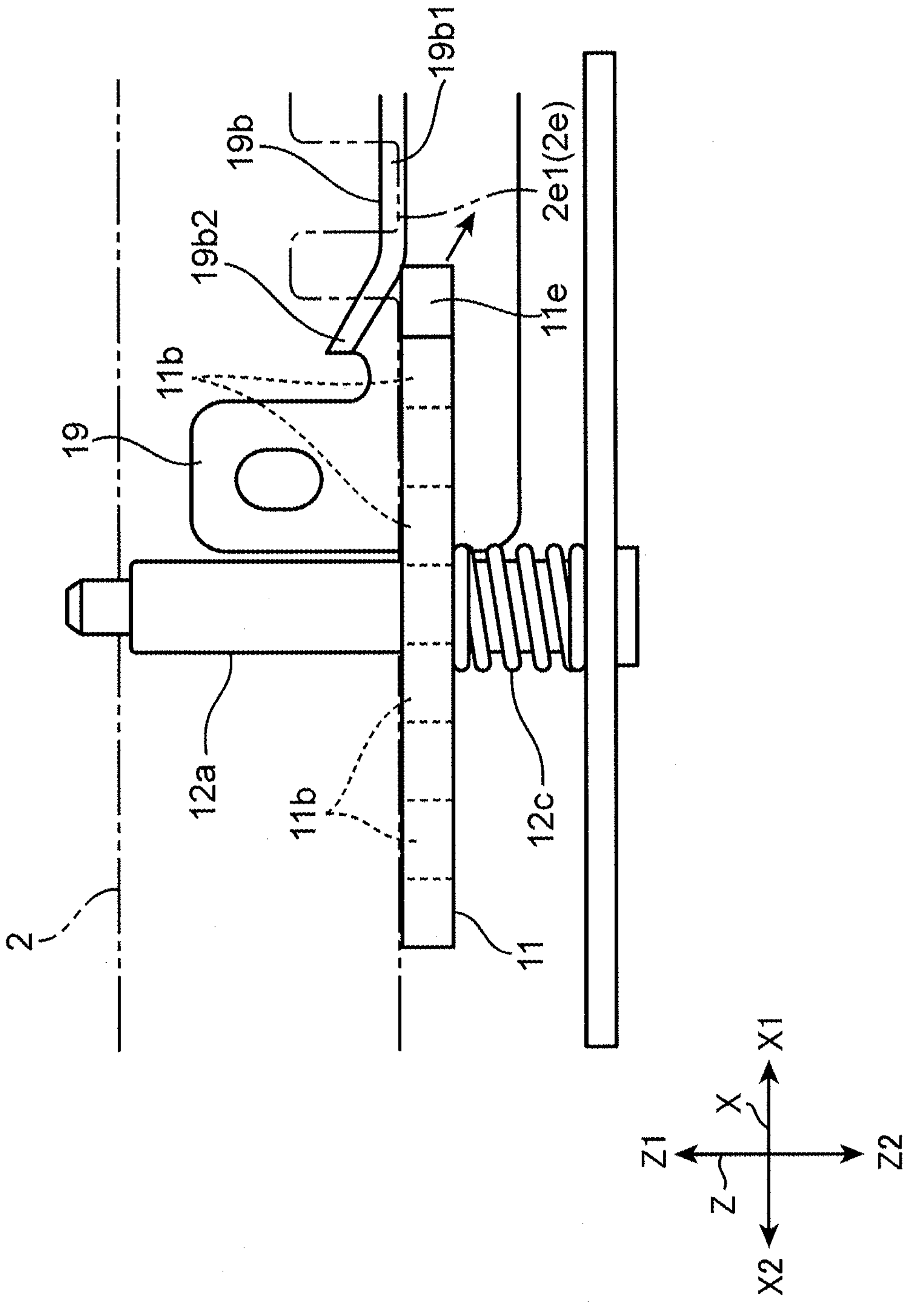
FIG. 10 is a side view schematically illustrating a state where a protrusion of the lock plate in FIG. 7 comes into contact with a first slope section of the guide part to be guided obliquely downward.

First, as illustrated in FIG. 9 to FIG. 10, when the lock plate 11 moves rearward X1 together with the upper rail 3, each protrusion 11*e* at the rear end of the lock plate 11 located rearward X1 comes into contact with the associated first slope section 19*b*2 of the associated guide part 19*b* to be guided obliquely downward (rearward X1 and downward Z2) along the first slope section 19*b*2.

Then, as illustrated in FIG. 11A to FIG. 14B, when the lock plate 11 moves further rearward X1, each of the pair of protrusions 11*e* of the lock plate 11 is guided rearward X1 along the associated main section 19*b*1 of the guide part 19*b* extending in the longitudinal direction X. The lower surface 19*b*4 of the main section 19*b*1 is at the height which is equal to or lower than the height of the leading ends of the lock teeth 2*e*. Thus, the lock plate 11 is not engaged with the lock teeth 2*e* in a state where the protrusion 11*e* is in contact with the main section 19*b*1.

In other words, in the states illustrated in FIG. 11A to FIG. 14B, the pair of guide parts 19*b* are configured to restrict the lock plate 11 from shifting upward Z1 and toward the lock teeth 2*e* by coming into contact with the upper surfaces of the pair of protrusions 11*e* of the lock plate 11 until the lock plate 11 reaches an engageable position where the first lock tooth 2*e*1 that is closest to the free zone FZ among the lock teeth 2*e* is engageable with an engaged hole 11*b*1 that is closest to the free zone FZ among the engaged holes 11*b* of the lock plate 11.

Figure 15A:
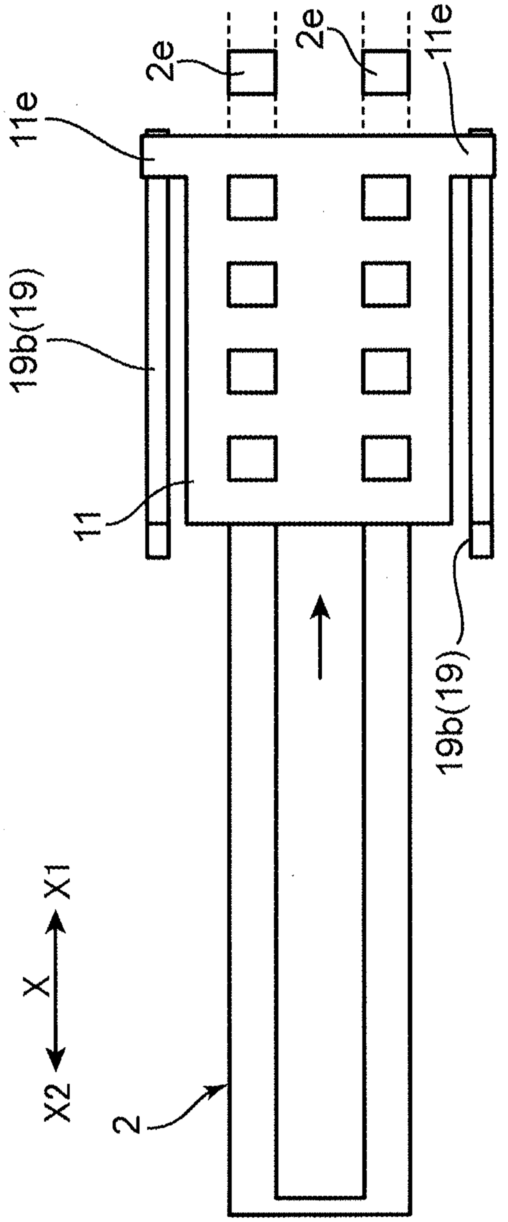
FIG. 15A is a bottom view of the lower rail, the lock plate, and the guide brackets.
Figure 15B:
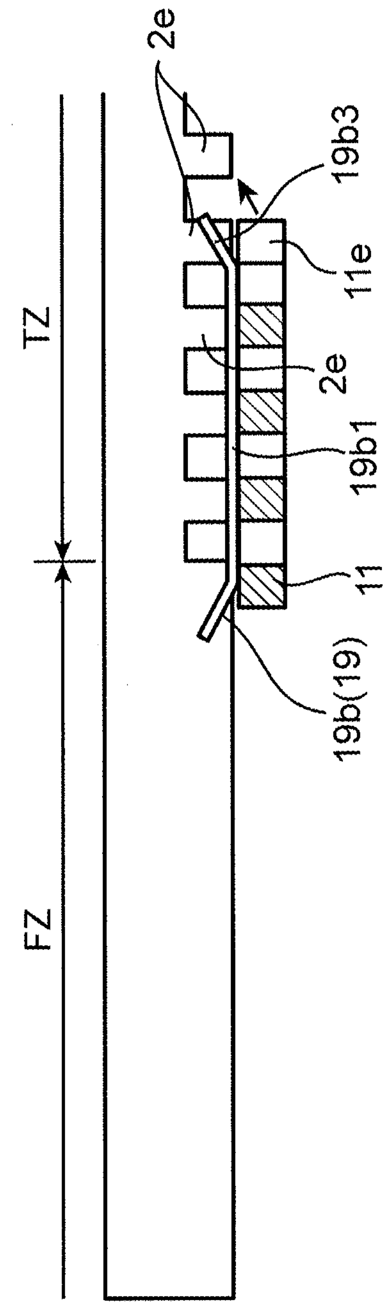
FIG. 15B is a front view of these elements with the lock plate seen in-cross section.

Thereafter, as illustrated in FIG. 15A and FIG. 15B, when each of the pair of protrusions 11*e* of the lock plate 11 passes over the main section 19*b*1 of the guide part 19*b*, the protrusion 11*e* is guided obliquely upward (rearward X1 and upward Z1) along the associated second slope section 19*b*3 of the guide part 19*b*. In other words, when the lock plate 11 reaches the engageable position, the pair of guide parts 19*b* are configured to allow the lock plate 11 to shift upward and toward the lock teeth 2*e* by releasing the restriction.

Figure 16A:
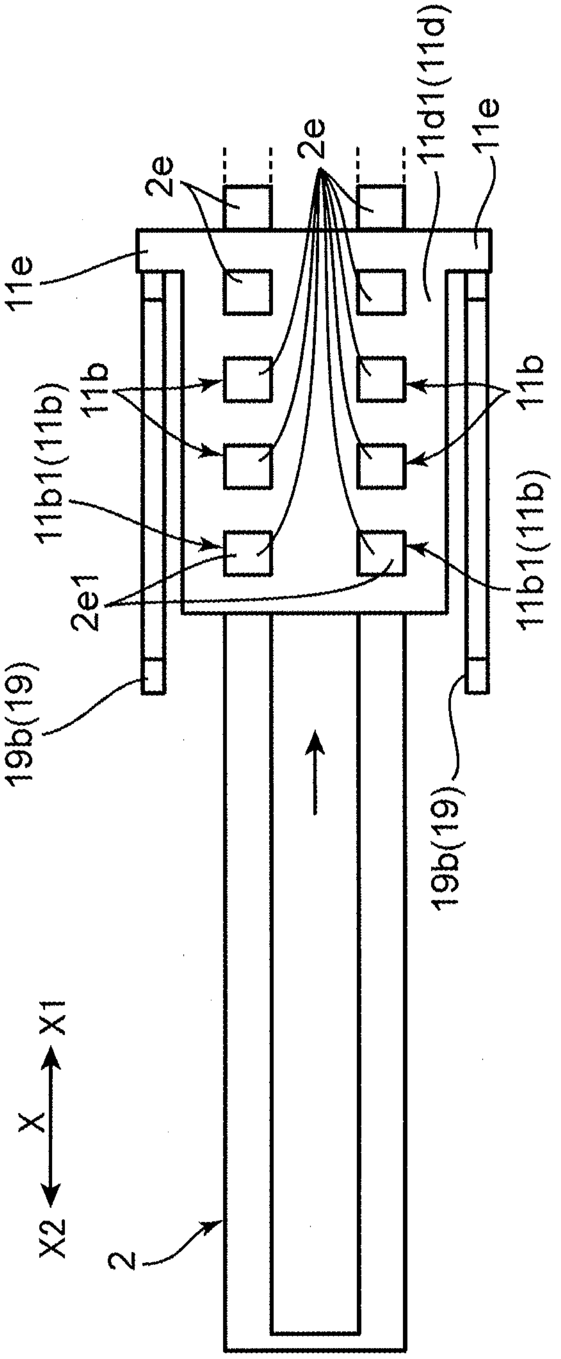
FIG. 16A is a bottom view of the lower rail, the lock plate, and the guide brackets.
Figure 16B:
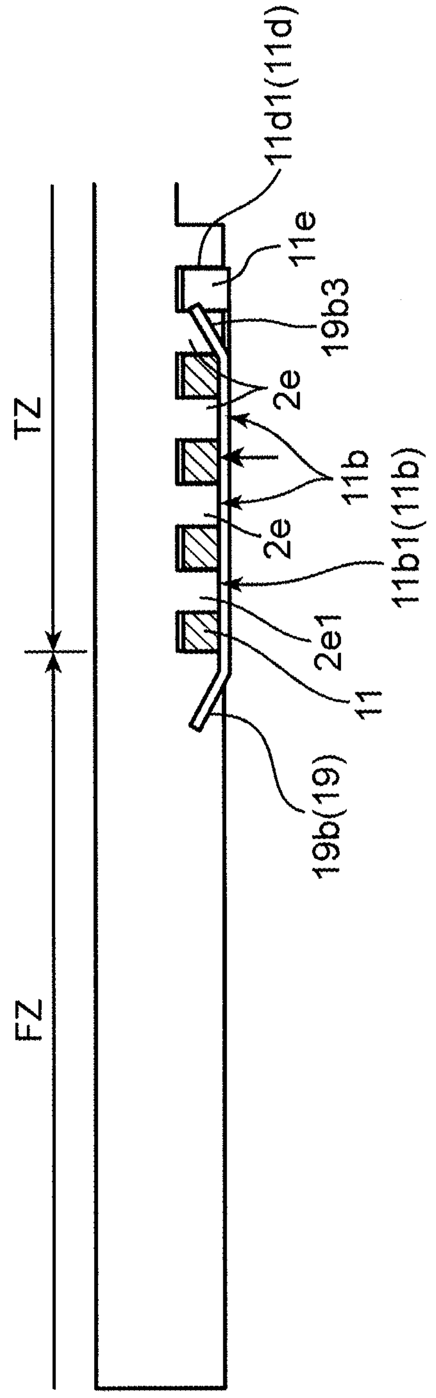
FIG. 16B is a front view of these elements with the lock plate seen in-cross section.

After the guide parts 19*b* release the restriction, that is, when each of the pair of protrusions 11*e* of the lock plate 11 reaches the non-contact portion for no contact with the associated guide part 19*b* in the state illustrated in FIG. 15A and FIG. 15B, the portion of the lock plate 11 between the pair of protrusions 11*e* comes into contact with the leading ends of the lock teeth 2*e*, and the lock plate 11 then shifts upward with an urging force of the lock plate spring 12*c* and reaches the locking position where the lock teeth 2*e* engage with the engaged holes 11*b* as illustrated in FIG. 16A and FIG. 16B. This results in preventing the lock plate 11 from incomplete locking, and achieves locking of the upper rail 3 in the periphery around the first lock tooth 2*e*1.

As illustrated in FIG. 16A and FIG. 16B, when the lock teeth 2*e* engage with the engaged holes 11*b*, an end edge 11*d*1 of the longitudinal end edge surface 11*d* that is located rearward X1 in the lock plate 11 comes into contact with a lock tooth 2*e* at a position after passing over the associated guide part 19*b*. Thus, the engaged holes 11*b* of the lock plate 11 are reliably engageable with the lock teeth 2*e* respectively.

Characteristics of the Embodiment (1) In the sliding device 1 of the embodiment, as illustrated in FIG. 5 and FIG. 7, the lock plate 11 in the lock mechanism 4 has the pair of protrusions 11*e* protruding in the width direction Y respectively from the opposite side surfaces 11*a* of the lock plate 11.

As illustrated in FIG. 3 and FIG. 7, the sliding device 1 includes the pair of guide parts 19*b* that restrict shifting of the lock plate 11 in the up-down direction Z by coming into contact with the pair of protrusions 11*e* in progress of the lock plate 11 moving from the free zone FZ into the lock teeth zone TZ.

In progress of the lock plate 11 moving from the free zone FZ into the lock teeth zone TZ, the pair of guide parts 19*b* are configured to restrict the lock plate 11 from shifting upward Z1 and toward the lock teeth 2*e* by coming into contact with the upper surfaces of the pair of protrusions 11*e* until the lock plate 11 reaches an engageable position where the first lock tooth 2*e*1 that is closest to the free zone FZ among the lock teeth 2*e* at the lower rail 2 is engageable with an engaged hole 11*b*1 that is closest to the free zone FZ among the engaged holes 11*b* of the lock plate 11.

In contrast, when the lock plate 11 reaches the engageable position, the pair of protrusions 11*e* of the lock plate 11 pass over the pair of guide parts 19*b*. Hence, the pair of guide parts 19*b* allow the lock plate 11 to shift upward Z1 and toward the lock teeth 2*e* by releasing the restriction.

Accordingly, when the upper rail 3 is slid along the lower rail 2, the lock plate 11 is restricted from shifting upward, in the periphery around the first lock tooth 2*e*1 of the lock teeth 2*e* at the lower rail 2, until the pair of protrusions 11*e* of the lock plate 11 pass over the pair of guide parts 19*b* and reach the engageable position where all the engaged holes 11*b* of the lock plate 11 are engageable with the lock teeth 2*e*. This configuration achieves prevention of incomplete locking, in the lock mechanism 4 including the lock plate 11 which is shiftable upward and downward, in the periphery around the first lock tooth 2*e*1 at the lower rail 2.

(2) In the sliding device 1 of the embodiment, the pair of guide parts 19*b* are respectively located at portions of the pair of side walls 2*b* of the lower rail 2, extend in the longitudinal direction X, and protrude inward in the width direction Y of the lower rail 2, each of the portions of the pair of side walls corresponding to the periphery around the first lock tooth 2*e*1 that includes the boundary between the free zone FZ and the lock teeth zone TZ in the longitudinal direction X.

In this configuration, when the upper rail 3 is slid along the lower rail 2, the guide parts 19*b* provided at the lower rail 2 restrict the lock plate 11 from shifting upward, in the periphery around the first lock tooth 2*e*1 among the lock teeth 2*e* that includes the boundary between the free zone FZ and the lock teeth zone TZ at the lower rail 2, until the pair of protrusions 11*e* of the lock plate 11 reach the engageable position where all the engaged holes 11*b* of the lock plate 11 are engageable with the lock teeth 2*e*. This configuration achieves prevention of incomplete locking in the periphery around the first lock tooth 2*e*1 at the lower rail 2.

(3) In the sliding device 1 of the embodiment, each of the portions of the pair of side walls 2*b* of the lower rail 2 corresponding to the periphery around the first lock tooth (or the first lock tooth 2*e*1) that includes the boundary between the free zone FZ and the lock teeth zone TZ in the longitudinal direction X has the long hole 2*f* penetrating the side wall 2*b* and extending in the longitudinal direction X.

The sliding device 1 includes the guide bracket 19 having a plate shape and attached to a region of the outer surface of each of the pair of side walls 2*b* of the lower rail 2, the region including the long hole 2*f* in the longitudinal direction X. Each guide part 19*b* constitutes a portion of the guide bracket 19 that bends inward in the width direction Y of the lower rail 2 and extends along the long hole 2*f* in the longitudinal direction X to be in the long hole 2*f*.

This configuration achieves accurate formation and positioning of the guide part 19*b* only by attaching the guide bracket 19 to the outer surface of the side wall 2*b* of the lower rail 2 and inserting the guide part 19*b* in the long hole 2*f* of the side wall 2*b*. In addition, the guide part 19*b* is easily manufacturable.

(4) In the sliding device 1 of the embodiment, the length and the position of each of the guide parts 19*b* are defined to allow the portion of the lock plate 11 between the pair of protrusions 11*e* to come into contact with the leading ends of the lock teeth 2*e* and then allow the lock plate 11 to shift upward with an urging force of the lock plate spring 12*c* and reach the locking position where the lock teeth 2*e* engage with the engaged holes 11*b*, after the guide parts 19*b* release the restriction (that is, when each of the pair of protrusions 11*e* shifts from the contact position for contact with the associated guide part 19*b* to the non-contact position).

This configuration enables the lock plate 11 to smoothly shift from the unlocking position to the locking position, and thus achieves smooth locking while preventing incomplete locking in the periphery around the first lock tooth 2*e*1.

(5) In the sliding device 1 of the embodiment, each of the guide parts 19*b* has a length which is equal to or longer than a portion of the engaged holes 11*b* in the lock plate 11.

In this configuration, the pair of guide parts 19*b* provided at the lower rail 2 reliably restrict the lock plate 11 from shifting upward until all the engaged holes 11*b* of the lock plate 11 are engageable with the lock teeth 2*e* in the locking position. The configuration thus achieves ensured prevention of incomplete locking in the periphery around the first lock tooth 2*e*1 at the lower rail 2.

Here, the ensured prevention of the incomplete locking is achieved even if each guide part 19*b* has a length which is slightly shorter than the length of the portion of the engaged holes 11*b*, as long as the portion of the lock plate 11 between the pair of protrusions 11*e* of the lock plate 11 comes into contact with the leading ends of the lock teeth 2*e*, and then, the lock plate 11 shifts upward and the lock teeth 2*e* are engageable with the engaged holes 11*b* as described in (4).

(6) In the sliding device 1 of the embodiment, the lower surface 19*b*4 of the main section 19*b*1 of each of the guide parts 19*b* extending in the longitudinal direction X is at the height which is equal to or lower than the height of the leading ends of the lock teeth 2*e*. This configuration reliably avoids the engagement between the lock plate 11 and the lock teeth 2*e* while the pair of protrusions 11*e* of the lock plate 11 and the pair of guide parts 19*b* provided at the lower rail 2 are in contact with each other. The configuration thus achieves ensured prevention of incomplete locking in the periphery around the first lock tooth 2*e*1 at the lower rail 2.

(7) In the sliding device 1 of the embodiment, as illustrated in FIG. 3, each of the guide parts 19*b* has the main section 19*b*1 extending in the longitudinal direction X and having the lower surface 19*b*4 to come into contact with the associated protrusion 11*e*, the first slope section 19*b*2 being continuous to the first end b11 of the main section 19*b*1 that is closer to the free zone FZ and sloping upward Z1 as advancing frontward X2 and away from the main section 19_b_1 in the longitudinal direction X, and the second slope section 19_b_3 being continuous to the second end b12 of the main section 19_b_1 that is closer to the lock teeth zone TZ and sloping upward Z1 as advancing rearward X1 and away from the main section 19_b_1 in the longitudinal direction X.

In this configuration, when the upper rail 3 is slid, each of the pair of protrusions 11_e_ of the lock plate 11 is first guided by the first slope section 19_b_2 of the corresponding one of the pair of guide parts 19_b_ and pushed downward in progress of approaching the guide part 19_b_ from the free zone FZ of the lower rail 2 as illustrated in FIG. 10. Thereafter, the protrusion 11_e_ comes to a contact position for contact with the lower surface 19_b_4 of the main section 19_b_1 of the guide part 19_b_ as illustrated in FIG. 11A and FIG. 11B. In this manner, the guide parts 19_b_ restrict the lock plate 11 from shifting upward Z1. Moreover, as illustrated in FIG. 15A to FIG. 16B, the protrusion 11_e_ is guided by the second slope section 19_b_3 to gradually shift upward Z1 after passing over the main section 19_b_1 of the associated guide part 19_b_. Consequently, the restriction is released, and the lock plate 11 is smoothly guided to the locking position where the lock teeth 2_e_ engage with the engaged holes 11_b_. This achieves smooth locking while preventing incomplete locking in the periphery around the first lock tooth 2_e_1.

Modifications (A) Although a part of the guide bracket 19 which is independent of the lower rail 2 bends inward of the lower rail 2 to form the guide part 19_b_ in the embodiment, the present invention is not limited thereto. A guide part may be configured to extend in the longitudinal direction X and protrude inward in the width direction Y of the lower rail 2.

In a modification of the present invention, guide parts may be formed by respectively lancing the pair of side walls 2_b_ of the lower rail 2 inward of the lower rail 2. This configuration enables integration of the guide parts and the lower rail 2, and attains a decrease in the number of components and saving of manufacturing cost.

(B) In another modification of the present invention, the sliding device may further include a cover that covers an outer surface of each of the pair of side walls 2_b_ of the lower rail 2 over a range of a corresponding one of the guide parts 19_b_ in the longitudinal direction X. This configuration enables the cover to close the long hole 2_f_ or other opening that opens in the side wall 2_b_ of the lower rail 2 around the guide part 19_b_, and thus can prevent foreign substances from intruding into the sliding device 1. Besides, the cover improves an appearance of the sliding device.

Here, in Modification (A) in which the guide parts are formed by respectively lancing the pair of side walls 2_b_ of the lower rail 2 inward of the lower rail 2, each side wall 2_b_ has an opening as well. In this regard, closing the opening with such a cover in the same manner leads to achieved prevention of intrusion of foreign substances.

Figure 17:
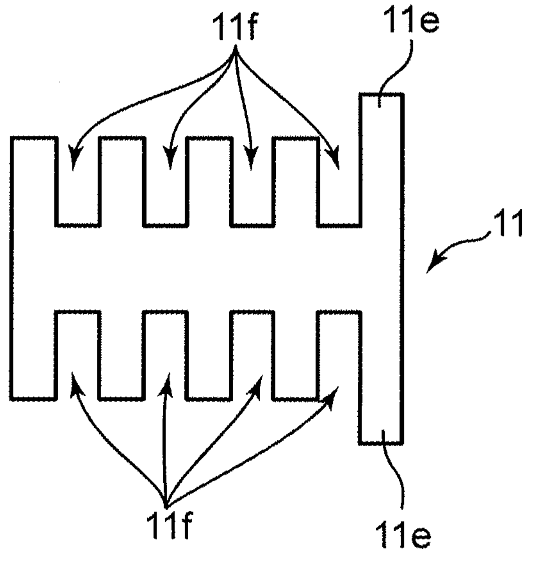
FIG. 17 is a plan view of a lock plate having a plurality of engaged parts in the form of a plurality of cutout grooves in a modification of the sliding device in the present invention.

(C) Although the embodiment exemplifies the plurality of (four) engaged holes 11_b_ serving as a plurality of engaged parts of the lock plate 11, the present invention is not limited thereto. In the present invention, such an engaged part may have any other shape in place of the hole as long as the engaged part is engageable with a lock tooth at a lower rail. For example, as illustrated in FIG. 17, a plurality of engaged parts may be in the form of a plurality of cutout grooves 11_f_ each having a specific size and located at a position where the cutout grooves are engageable with lock teeth.

The number of engaged parts is not particularly limited in the present invention, but a larger number of engaged parts leads to more reliable engagement between the lock plate and the lock teeth.

(D) A guide part may be only configured to extend in the longitudinal direction X and protrude inward in the width direction Y of the lower rail 2. Thus, in a configuration other than the embodiment and Modification (A), a guide part may constitute a portion of the associated side wall 2_b_ of the lower rail 2 that bends inward to protrude inward. Alternatively, the guide part may be attached to the inner surface of the side wall 2_b_ of the lower rail by welding or other way.

(E) The embodiment exemplifies application of the sliding device 1 to a walk-in sliding device that moves the seat S rearward X1 to a large extent. Further, the free zone FZ is located frontward X2 of the lock teeth zone TZ at the inner wall 2_d_ of the lower rail 2, and the pair of protrusions 11_e_ of the lock plate 11 protrude in the width direction Y respectively from the rear ends of the side surfaces 11_a_. However, the arrangement and the shape of each protrusion 11_e_ is not limited thereto.

Specifically, in a modification of the present invention, a lock plate 11 is longer in the longitudinal direction X of the lower rail 2 to meet free zones FZ at front and rear positions of a lock teeth zone TZ respectively. Besides, another pair of protrusions 11_e_ may be provided to front ends of side surfaces 11_a_ in addition to protrusions at rear ends thereof (that is, protrusions may be provided at respective ends closer to the lock teeth zone TZ in view of the front and rear free zones FZ). This configuration achieves prevention of incomplete locking even in progress of the lock plate 11 moving from any of the front and rear free zones FZ into the lock teeth zone TZ.

(F) A dimension (or width) of each protrusion 11_e_ of the lock plate 11 in the longitudinal direction X and the position of each guide part 19_b_ may be defined in place of the length and the position of the guide part 19_b_ in the embodiment to satisfy the following definition condition described in item (4) in the section "Characteristics of the embodiment":

"to allow the portion of the lock plate 11 between the pair of protrusions 11_e_ to come into contact with the leading ends of the lock teeth 2_e_ and then allow the lock plate 11 to shift upward with an urging force of the lock plate spring 12_c_ and reach the locking position where the lock teeth 2_e_ engage with the engaged holes 11_b_, after the guide parts 19_b_ release the restriction (that is, when each of the pair of protrusions 11_e_ shifts from the contact position for contact with the associated guide part 19_b_ to the non-contact position)".

Figures 18A, 18B:
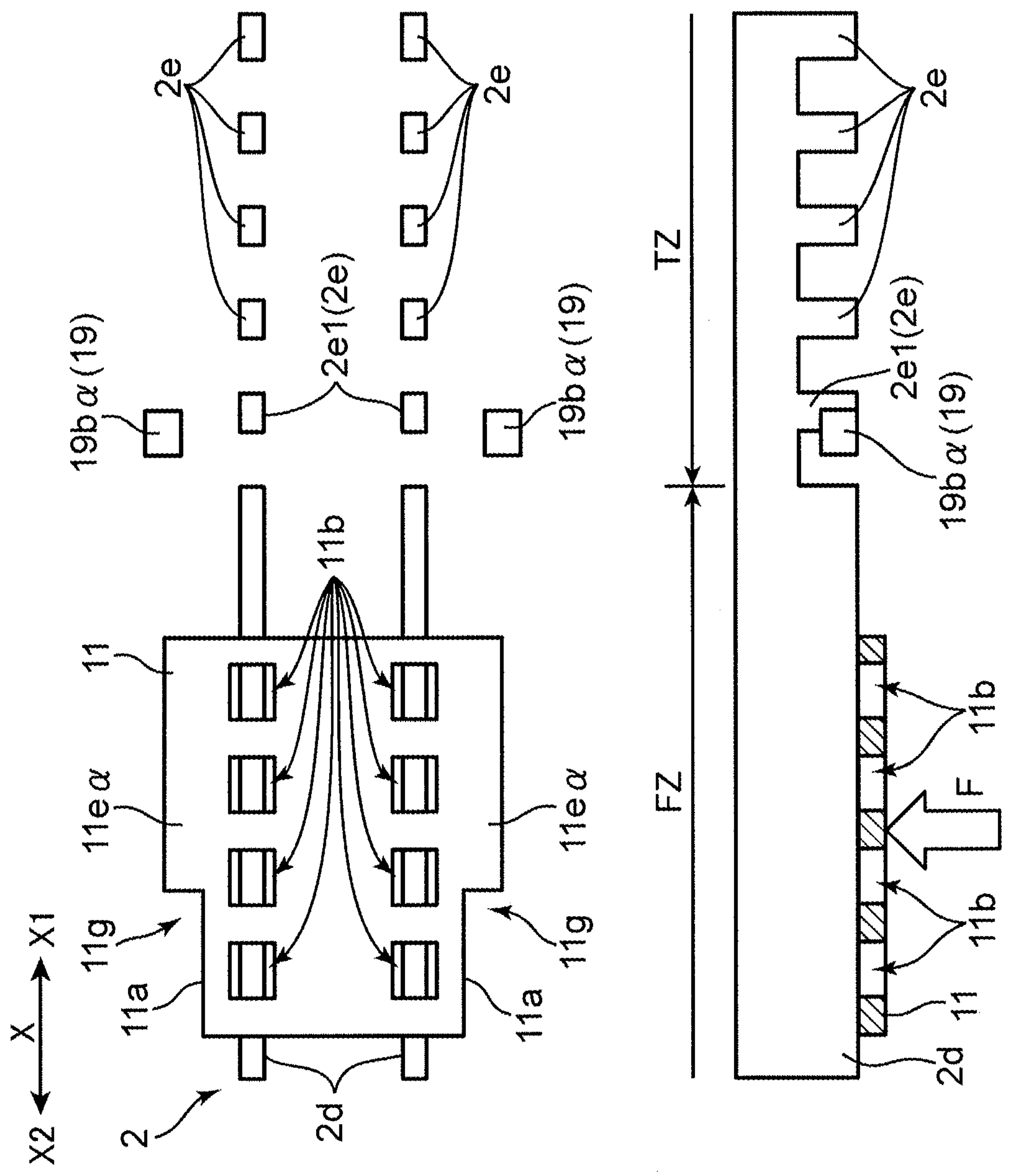
FIG. 18A is a bottom view of a lower rail, the lock plate, and guide brackets.
FIG. 18B is a front view of these elements with the lock plate seen in-cross section.

Specifically, to satisfy the definition condition, as illustrated in FIG. 18A and FIG. 18B, a lock plate 11 may have a pair of protrusions 11_eα_ each having a larger dimension in a longitudinal direction X, a pair of guide parts 19_bα_ may each have a smaller dimension in the longitudinal direction X, and each of the guide parts 19_bα_ may be arranged in a periphery around a first lock tooth 2_e_1 (specifically, arranged to overlap a half portion of the first lock tooth 2_e_1 that is closer to a free zone FZ in the longitudinal direction X).

In manufacturing the lock plate 11 illustrated in FIG. 18A to FIG. 18B, a large rectangular plate having a portion corresponding to each of the pair of protrusions 11_eα_ is prepared. A cutout 11_g_ is made in a portion located away X2 from the lock teeth zone TZ farther than the portion of each of the protrusions 11_eα_ in the longitudinal direction X. This makes it possible to manufacture such a lock plate 11 having a pair of protrusions 11_eα_ (hereinafter, referred to as "enlarged protrusions 11_eα_") protruding from the opposite side surfaces 11*a* of the lock plate 11 and each having a larger dimension in the longitudinal direction X.

Figure 19A:
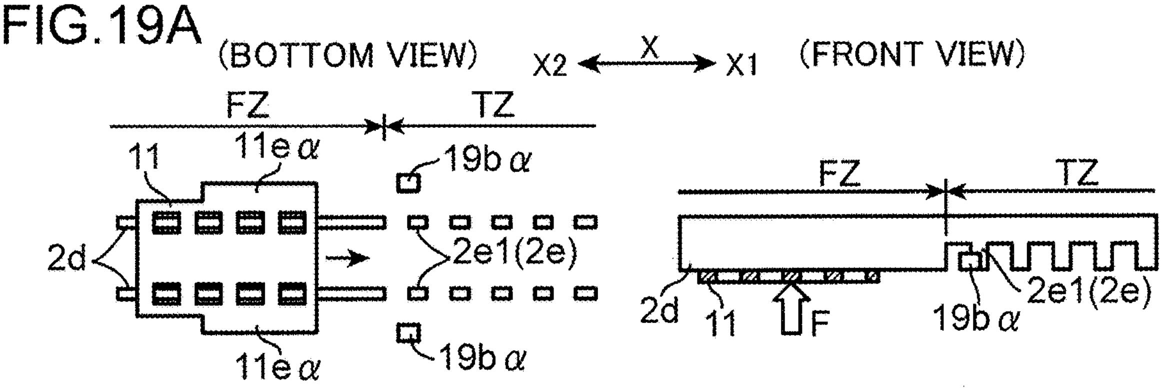
FIG. 19A to FIG. 19E are explanatory views showing operations of the sliding device in FIG. 18A to FIG. 18B.
Figure 19B:
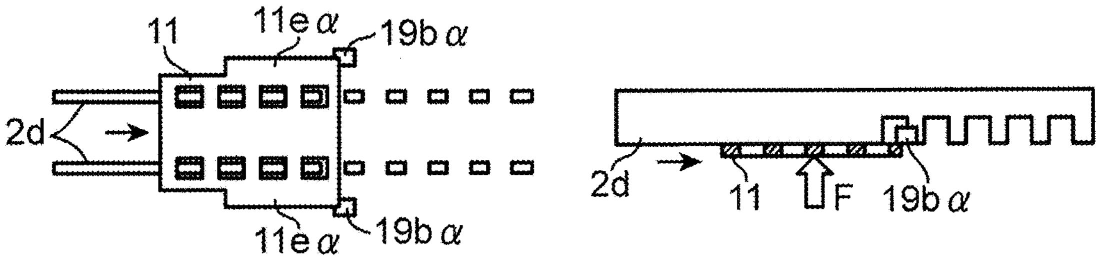
Figure 19C:
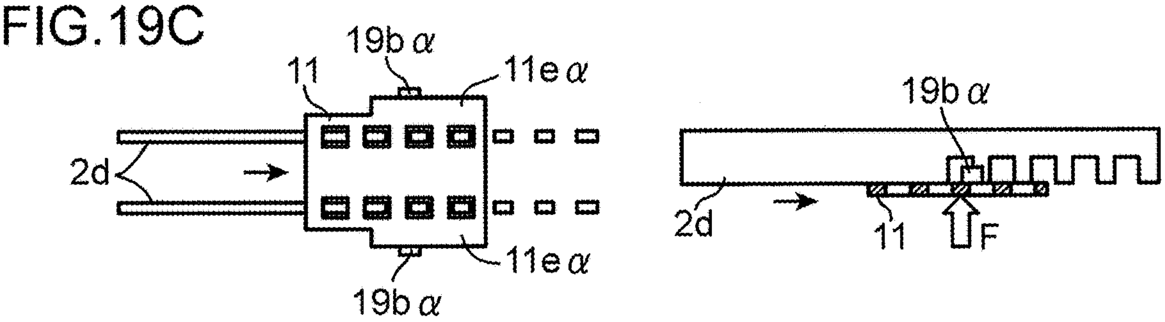
Figure 19D:
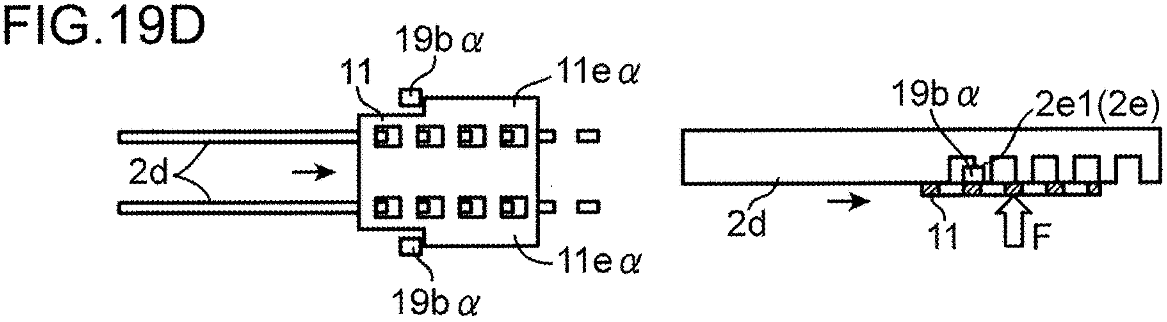
Figure 19E:
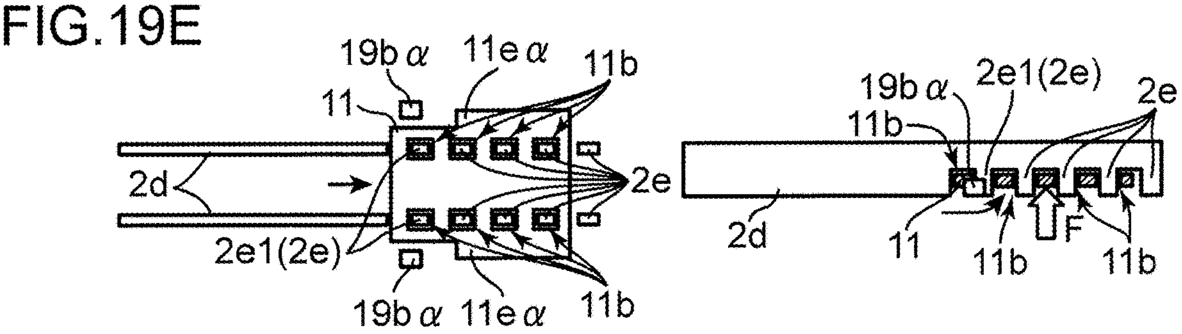

In Modification (F), as illustrated in FIG. 19A to FIG. 19C, upward shifting of the lock plate 11 with an urging force F of a lock plate spring 12*c* is restricted while each enlarged protrusion 11*e*α of the lock plate 11 is in contact with an associated guide part 19*b*α. Thereafter, as illustrated in FIG. 19D and FIG. 19E, the restriction is released and the lock plate 11 is engageable with lock teeth 2*e* when the enlarged protrusion 11*e*α is no longer in contact with the guide part 19*b*α.

Conclusively, in Modification (F) illustrated in FIG. 18A to FIG. 18B and FIG. 19A to FIG. 19E, defining the width of the protrusion 11*e*α and the position of the guide part 19*b*α in the longitudinal direction under the aforementioned definition condition enables the lock plate 11 to smoothly shift to a locking position after the guide part 19*b*α releases the restriction. This configuration thus achieves smooth locking while preventing incomplete locking in a periphery around the first lock tooth 2*e*1.

Figures 20A, 20B:
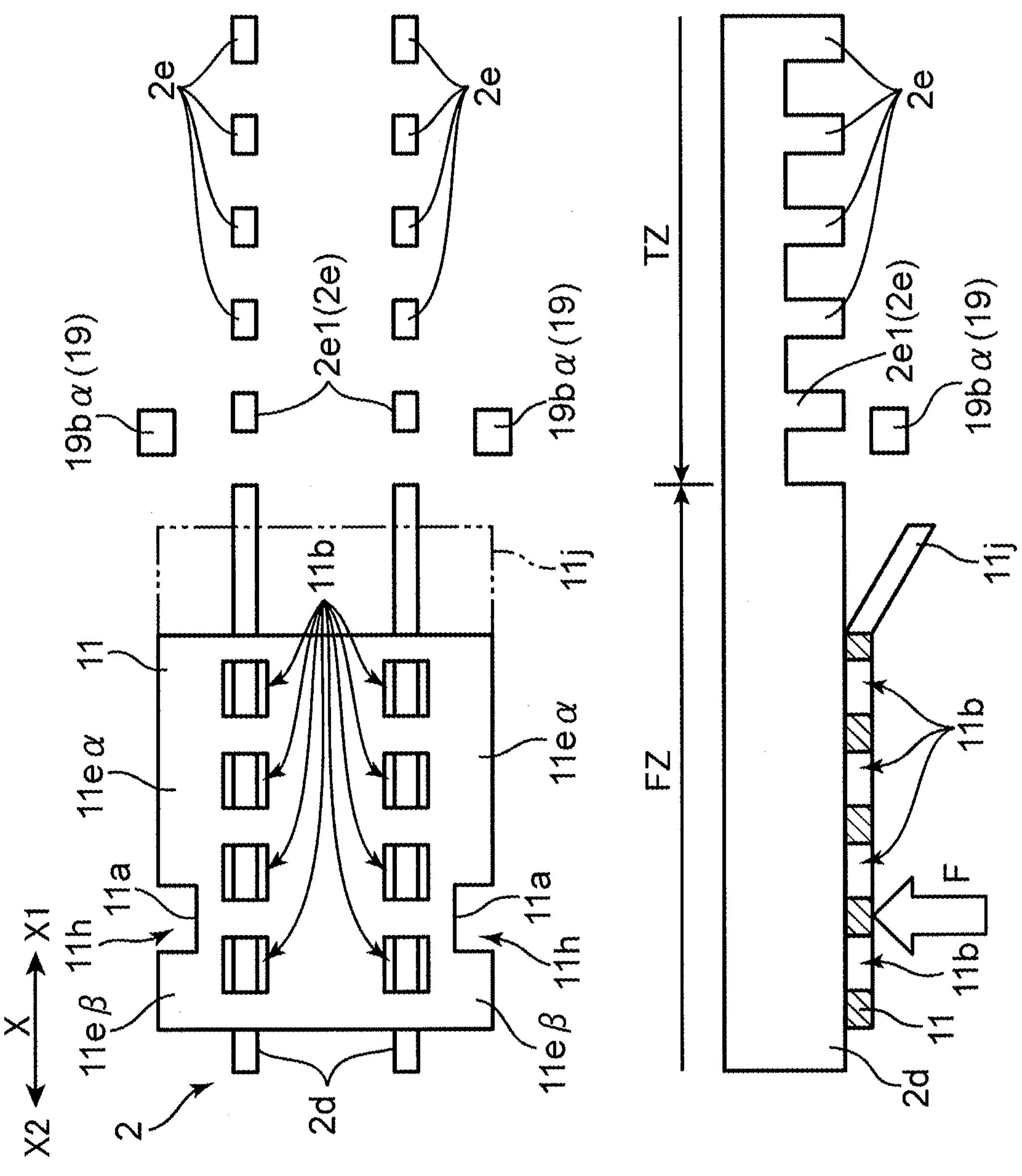
FIG. 20A is a bottom view of a lower rail, the lock plate, and guide brackets.
FIG. 20B is a front view of these elements with the lock plate seen in-cross section.

(G) In a modification further modified from Modification (F), as illustrated in FIGS. 20A and 20B, a pair of additional protrusions 11*e*β may be provided, in addition to the pair of enlarged protrusions 11*e*α, away X2 from the lock teeth zone TZ farther than the protrusions 11*e*α in a longitudinal direction X.

To manufacture a lock plate 11 illustrated in FIG. 20A to 20B, a rectangular plate having a large size and including portions corresponding to the pair of enlarged protrusions 11*e*α and the pair of additional protrusions 11*e*β is prepared. A cutout groove 11*h* is made between the portion corresponding to each enlarged protrusion 11*e*α and the portion corresponding to each additional protrusion 11*e*β. This makes it possible to manufacture such a lock plate 11 having: a pair of protrusions 11*e*α and a pair of additional protrusions 11*e*β respectively protruding from the opposite side surfaces 11*a* of the lock plate 11; and a cutout groove 11*h* between each enlarged protrusion 11*e*α and each additional protrusion 11*e*β.

The lock plate 11 illustrated in FIG. 20A to 20B further has a slope plate part 11*j* sloping downward at an end that is closer X1 to the lock teeth zone TZ. In the example illustrated in FIG. 20A to FIG. 20B, the lock plate 11 has the slope plate part 11*j* sloping downward. Thus, a guide part 19*b*α is below a height position for contact with the slope plate part 11*j*, that is, below a first lock tooth 2*e*1 in the up-down direction. The guide part 19*b*α may be arranged to overlap a half portion of the first lock tooth 2*e*1 that is closer to the free zone FZ in the longitudinal direction X in the same manner as Modification (F).

Figure 21A:
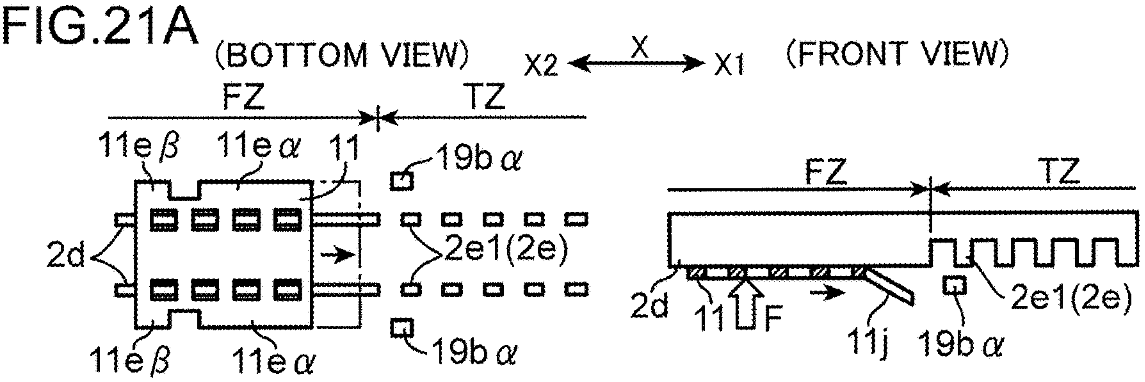
FIG. 21A to FIG. 21E are explanatory views illustrating operations of the sliding device in FIG. 20A to FIG. 20B.
Figure 21B:
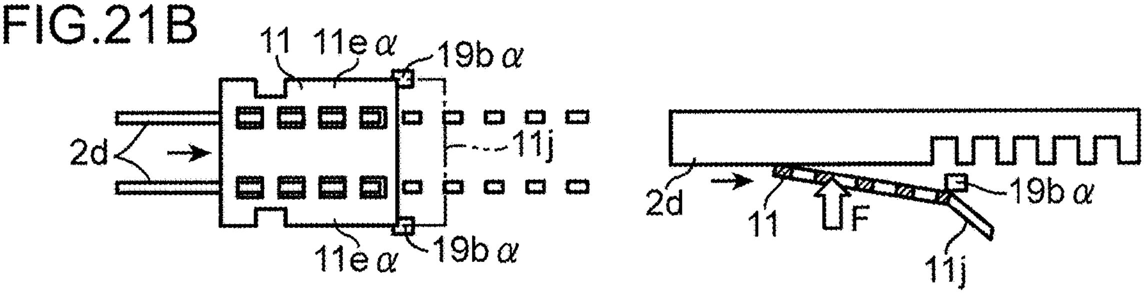
Figure 21C:
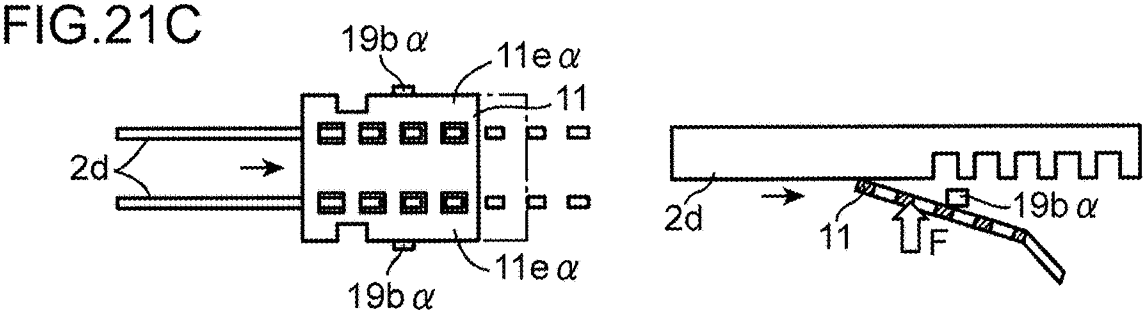

In Modification (G), as illustrated in FIG. 21A to FIG. 21C, upward shifting of the lock plate 11 with an urging force F of a lock plate spring 12*c* is restricted while each enlarged protrusion 11*e*α of the lock plate 11 is in contact with the associated guide part 19*b*α. Thereafter, as illustrated in FIG. 21D and FIG. 21E, the restriction is released and the lock plate 11 is engageable with lock teeth 2*e* when the enlarged protrusion Ile is no longer in contact with the guide part 19*b*α.

Accordingly, in Modification (G) illustrated in FIG. 20A to FIG. 20B and FIG. 21A to FIG. 21E, defining the width of the protrusion 11*e*α and the position of each guide part 19*b*α in the longitudinal direction under the aforementioned definition condition enables the lock plate 11 to smoothly shift to a locking position after the guide parts 19*b*α release the restriction. The configuration thus achieves smooth locking while preventing incomplete locking in a periphery around a first lock tooth 2*e*1.

Moreover, in Modification (G), in progress of the lock plate 11 moving from the free zone FZ into a lock teeth zone TZ, the slope plate part 11*j* of the lock plate 11 comes into contact with the guide part 19*b*α, so that the lock plate 11 moves into the lock teeth zone TZ while being pushed downward, that is, shifts downward and away from the first lock tooth 2*e*1. This achieves ensured prevention of incomplete locking in the periphery around the first lock tooth 2*e*1.

Figure 21D:
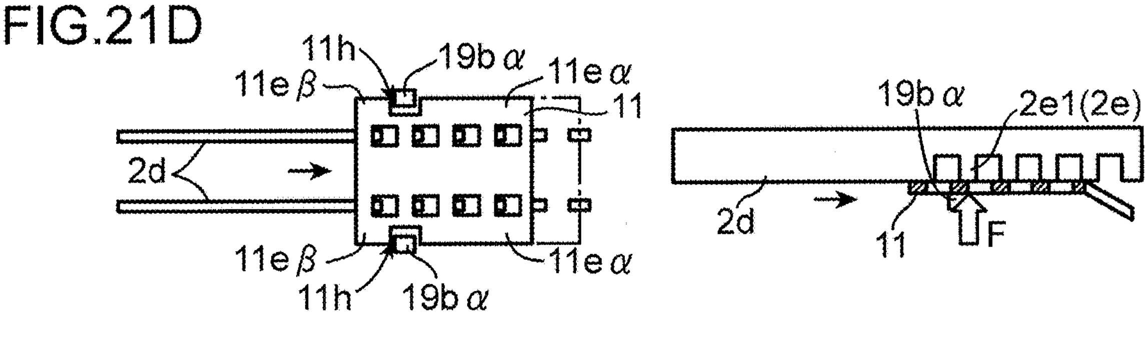
Figure 21E:
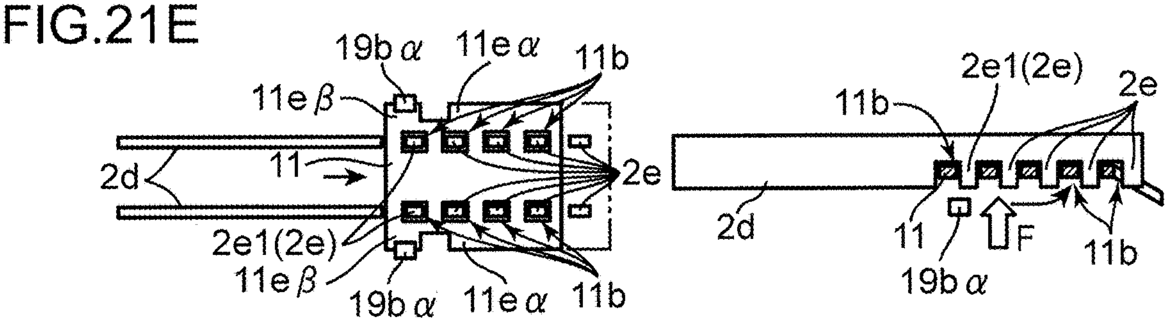
Figure 22A:
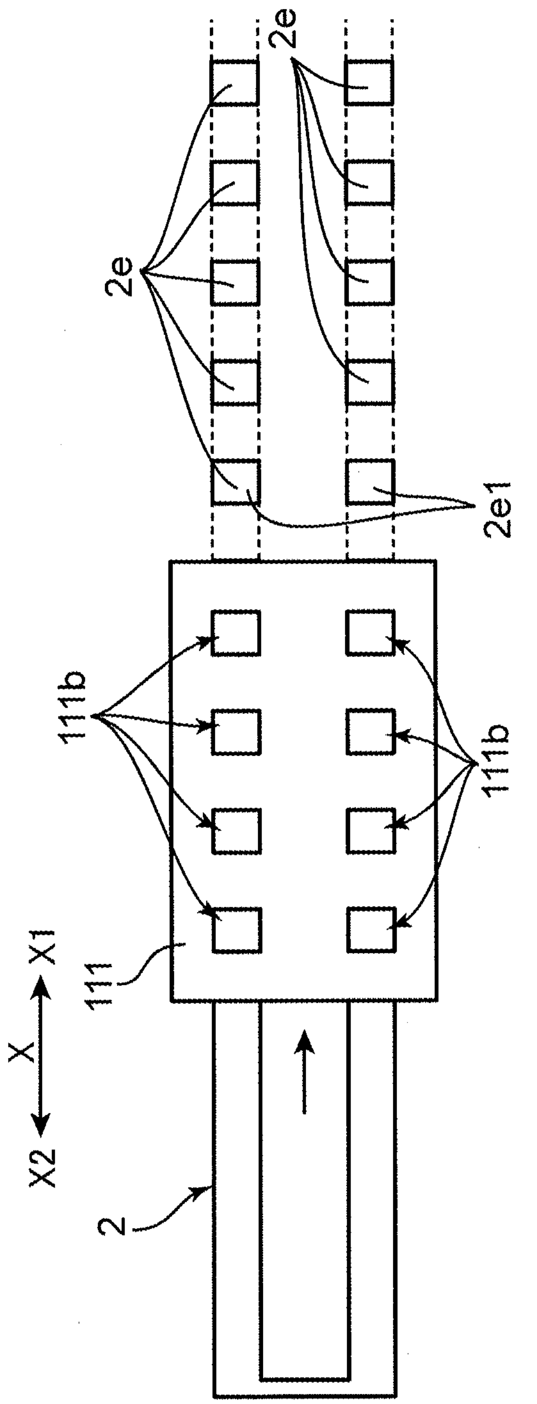
FIG. 22A is a bottom view of a lower rail and the lock plate.
Figure 22B:
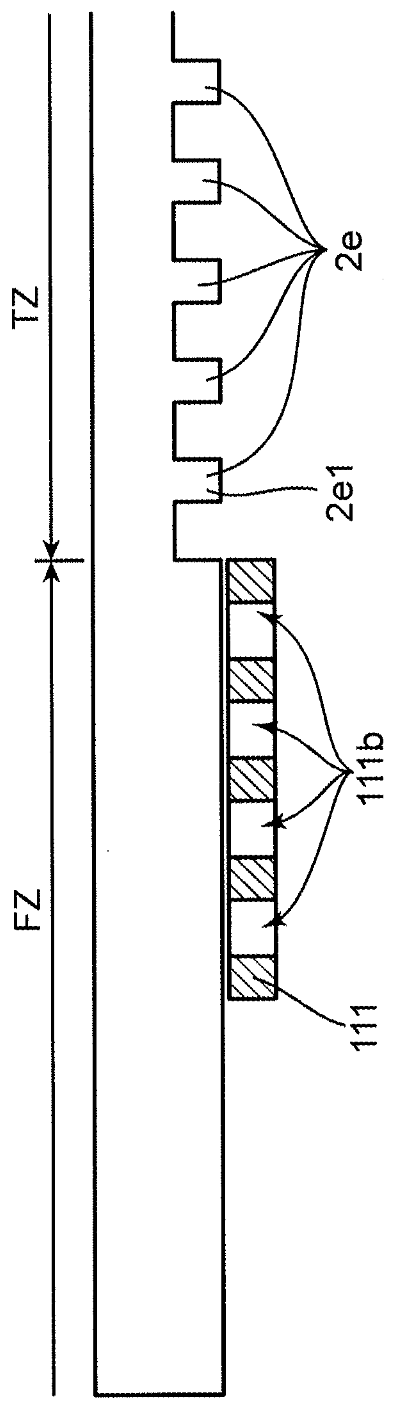
FIG. 22B is a front view of these elements with the lock plate seen in-cross section.
Figures 23A, 23B:
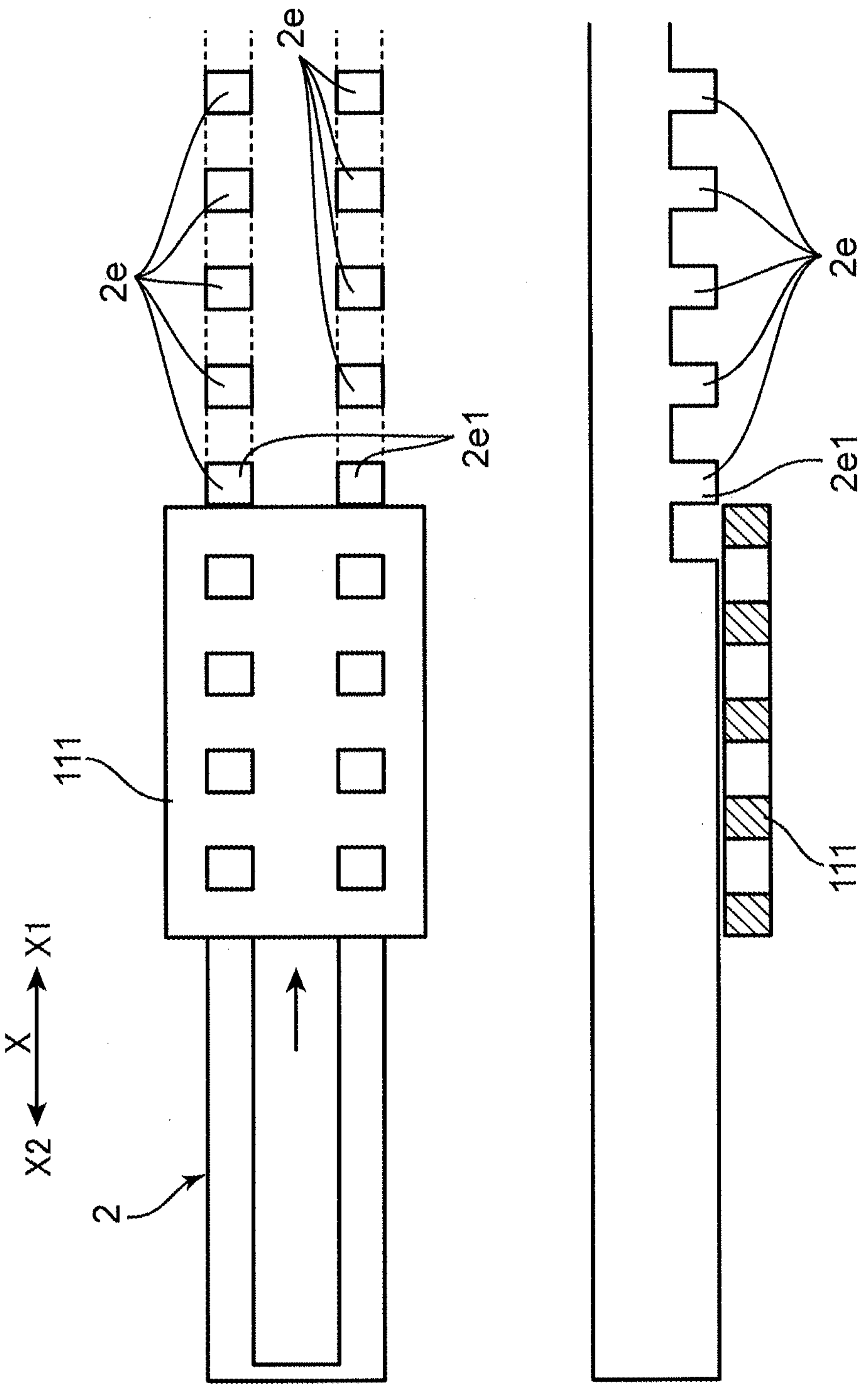
FIG. 23A is a bottom view of the lower rail and the lock plate.
FIG. 23B is a front view of these elements with the lock plate seen in-cross section.
Figure 24A:
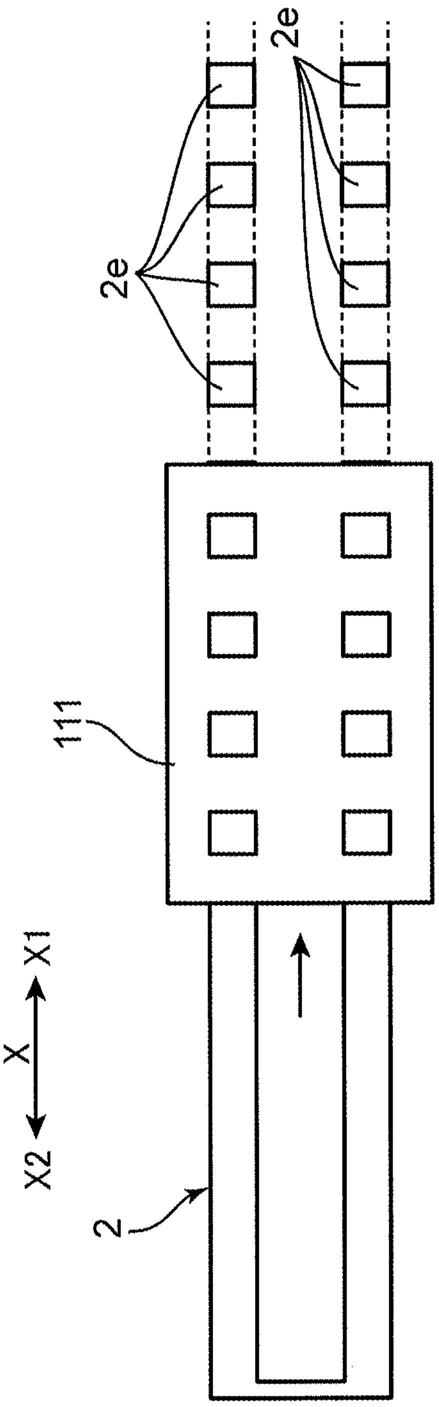
FIG. 24A is a bottom view of the lower rail and the lock plate.
Figure 24B:
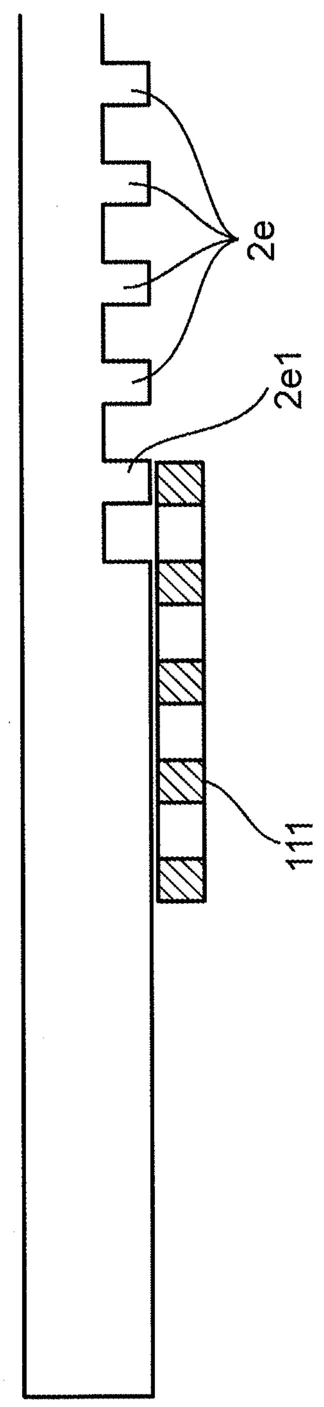
FIG. 24B is a front view of these elements with the lock plate seen in-cross section.

Furthermore, in Modification (G), as illustrated in FIG. 21D and FIG. 21E, when the enlarged protrusions 11*e*α are no longer in contact with the guide parts 19*b*α, the guide parts 19*b*α release the restriction of the upward shifting of the lock plate 11. At this time, each guide part 19*b*α enters the associated cutout groove 11*h* between the protrusion 11*e*α and the associated additional protrusion 11*e*β to allow the lock plate 11 to be engaged with the lock teeth 2*e*. As illustrated in FIG. 21E, in a state where the lock plate 11 is engaged with the lock teeth 2*e*, the guide part 19*b*α is located below and away from the additional protrusion 11*e*β. Hence, the guide parts 19*b*α can further exert the function of preventing the lock plate 11 from coming off.

(H) Although the embodiment exemplifies application of the sliding device 1 to a walk-in sliding device that moves the seat S in the front-rear direction, the present invention is not limited thereto. Specifically, the present invention covers a sliding device that slides a seat in a width direction (or left-right direction) with a lower rail and an upper rail extending in the width direction of the seat.

Summary of Embodiment

The embodiment is summarized in the following manner.

A sliding device in the embodiment includes: a lower rail that is a long member to be fixedly attached to a mounting surface over which the seat is arranged; an upper rail having a portion to be fixedly attached to the seat, and guided by the lower rail movably in a longitudinal direction of the lower rail; and a lock mechanism that is attached to the upper rail for locking the upper rail in a specific position in the longitudinal direction. The lower rail includes a pair of side walls extending in the longitudinal direction and facing each other, and at least one inner wall located between the pair of side walls and extending in the longitudinal direction. The inner wall has a predetermined lock teeth zone bearing a plurality of lock teeth protruding downward and arrayed in the longitudinal direction, and a free zone located adjacent to the lock teeth zone and extending in the longitudinal direction in without a lock tooth. The lock mechanism includes: a lock plate located between the pair of side walls of the lower rail, having a plurality of engaged parts arrayed in the longitudinal direction to be engageable with the lock teeth, and being configured to move together with the upper rail over the free zone and the lock teeth zone in the longitudinal direction; and an urging member that urges the lock plate upward so that the engaged parts are engaged with the lock teeth. The lock plate has at least one pair of protrusions protruding in a width direction perpendicularly intersecting the longitudinal direction respectively from opposite side surfaces of the lock plate that face in the width direction at positions closer to the lock teeth zone on the opposite side surfaces. The sliding device further includes: a pair of guide parts that restrict shifting of the lock plate in an up-down direction by coming into contact with the pair of protrusions. The pair of guide parts are configured to, in progress of the lock plate moving from the free zone into the lock teeth zone, restrict the lock plate from shifting upward and toward the lock teeth until the lock plate reaches an engageable position where a first lock tooth that is closest to the free zone among the lock teeth is engageable with an engaged part that is closest to the free zone among the engaged parts of the lock plate, and allow the lock plate to shift upward and toward the lock teeth when the lock plate reaches the engageable position.

In the sliding device, the lock plate has the pair of protrusions protruding in the width direction perpendicularly intersecting the longitudinal direction of the lower rail respectively from the opposite side surfaces of the lock plate that face in the width direction at the positions closer to the lock teeth zone on the opposite side surfaces.

The sliding device includes the pair of guide parts that restrict the shifting of the lock plate in the up-down direction by coming into contact with the pair of protrusions.

In progress of the lock plate moving from the free zone into the lock teeth zone, the pair of guide parts are configured to restrict the lock plate from shifting upward and toward the lock teeth by coming into contact with the pair of protrusions until the lock plate reaches the engageable position where the first lock tooth that is closest to the free zone among the lock teeth is engageable with the engaged part that is closest to the free zone among the engaged parts of the lock plate. When the lock plate reaches the engageable position, the pair of guide parts are configured to permit the lock plate to shift upward and toward the lock teeth by releasing the restriction.

Accordingly, when the upper rail is slid along the lower rail, the guide parts restrict the lock plate from shifting upward, in the periphery around the first lock tooth among the lock teeth, until the lock plate reaches the engageable position where all the engaged parts of the lock plate are engageable with the lock teeth. This configuration achieves prevention of incomplete locking, in the lock mechanism including the lock plate which is shiftable upward and downward, in the periphery around the first lock tooth at the lower rail.

In the sliding device, it is preferable that the pair of guide parts are respectively located at portions of the pair of side walls of the lower rail, extend in the longitudinal direction, and protrude inward in the width direction of the lower rail, each of the portions of the pair of side walls corresponding to a periphery around the first lock tooth that includes a boundary between the free zone and the lock teeth zone in the longitudinal direction.

In this configuration, when the upper rail is slid along the lower rail, the guide parts provided at the lower rail restrict the lock plate from shifting upward, in the periphery around the first lock tooth among the lock teeth that includes the boundary between the free zone and the lock teeth zone at the lower rail, until all the engaged parts of the lock plate are engageable with the lock teeth at the engageable position. The configuration thus achieves prevention of incomplete locking in the periphery around the first lock tooth at the lower rail.

In the sliding device, each of the portions of the pair of side walls of the lower rail corresponding to the periphery around the first lock tooth that includes a boundary between the free zone and the lock teeth zone in the longitudinal direction preferably has a long hole penetrating the side wall and extending in the longitudinal direction. The sliding device preferably includes a guide bracket having a plate shape and attached to a region of an outer surface of each of the pair of side walls of the lower rail, the region including the long hole in the longitudinal direction. Each of the guide parts preferably constitutes a portion of the guide bracket that bends inward in the width direction of the lower rail and extends along the long hole in the longitudinal direction to be in the long hole.

This configuration enables accurate formation and positioning of the guide part only by attaching the guide bracket to the outer surface of the side wall of the lower rail and inserting the guide part in the long hole of the side wall.

In the sliding device, the guide parts may be formed by respectively lancing the pair of side walls of the lower rail inward of the lower rail.

This configuration enables integration of the guide parts and the lower rail, and attains a decrease in the number of components and saving of manufacturing cost.

The sliding device preferably further includes a cover that covers an outer surface of each of the pair of side walls of the lower rail over a range of corresponding one of the guide parts in the longitudinal direction.

This configuration enables the cover to close the long hole or other opening that opens in the side wall of the lower rail around the guide part, and thus can prevent foreign substances from intruding into the sliding device. Besides, the cover improves an appearance of the sliding device.

In the sliding device, it is preferable that a length and a position of each of the guide parts are preferably defined to allow a portion of the lock plate between the pair of protrusions to come into contact with leading ends of the lock teeth and then allow the lock plate to shift upward with an urging force of the urging member and reach a locking position where the lock teeth engage with the engaged parts, after the guide parts release the restriction.

In this configuration, defining the length and the position of each guide part in this manner allows the lock plate to smoothly shift to the locking position after the restriction by the guide parts is released. The configuration thus achieves smooth locking while preventing incomplete locking in the periphery around the first lock tooth.

In the sliding device, it is preferable that a width of each of the protrusions and a position of each of the guide parts in the longitudinal direction are defined to allow a portion of the lock plate between the pair of protrusions to come into contact with the leading ends of the lock teeth and then allow the lock plate to shift upward with an urging force of the urging member and reach a locking position where the lock teeth engage with the engaged parts, after the guide parts release the restriction.

In this configuration, defining the width of each protrusion and the position of each guide part in the longitudinal direction in this manner allows the lock plate to smoothly shift to the locking position after the restriction by the guide parts is released. The configuration thus achieves smooth locking while preventing incomplete locking in the periphery around the first lock tooth.

In the sliding device, each of the guide parts preferably has a length which is equal to or longer than a portion the engaged parts in the lock plate.

In this configuration, the pair of guide parts provided at the lower rail reliably restrict the lock plate from shifting upward until all the engaged parts of the lock plate are engageable with the lock teeth in the locking position. The configuration thus achieves ensured prevention of incomplete locking in the periphery around the first lock tooth at the lower rail.

In the sliding device, each of the guide parts preferably has a section extending in the longitudinal direction, and a lower surface of the section is at a height which is equal to or lower than a height of leading ends of the lock teeth.

This configuration reliably avoids engagement between the lock plate and the lock teeth while the pair of protrusions of the lock plate and the pair of guide parts provided at the lower rail are in contact with each other. The configuration thus achieves ensured prevention of incomplete locking in the periphery around the first lock tooth at the lower rail.

In the sliding device, each of the guide parts preferably has a main section extending in the longitudinal direction and having a lower surface to come into contact with the protrusion, a first slope section being continuous to a first end of the main section that is closer to the free zone and sloping upward as advancing away from the main section in the longitudinal direction, and a second slope section being continuous to a second end of the main section that is closer to the lock teeth zone and sloping upward as advancing away from the main section in the longitudinal direction.

In this configuration, when the upper rail is slid, each of the pair of protrusions of the lock plate is first guided by the first slope section of corresponding one of the pair of guide parts and pushed downward in progress of approaching the guide part from the free zone of the lower rail. Thereafter, the protrusion comes to a contact position for contact with the lower surface of the main section of the guide part. In this manner, the guide parts restrict the lock plate from shifting upward. Moreover, each protrusion is guided by the second slope section to gradually shift upward after passing over the main section of the associated guide part. Consequently, the restriction is released, and the lock plate is smoothly guided to the locking position where the lock teeth engage with the engaged parts. The configuration thus achieves smooth locking while avoiding incomplete locking in the periphery around the first lock tooth.

Conclusively, the sliding device in the embodiment achieves prevention of incomplete locking in the periphery around the first lock tooth at the lower rail.

The invention claimed is:

1. A sliding device, comprising:

a lower rail that is a long member to be fixedly attached to a mounting surface over which the seat is arranged;

an upper rail having a portion to be fixedly attached to the seat, and guided by the lower rail movably in a longitudinal direction of the lower rail; and a lock mechanism that is attached to the upper rail for locking the upper rail in a specific position in the longitudinal direction, wherein the lower rail includes a pair of side walls extending in the longitudinal direction and facing each other, and at least one inner wall located between the pair of side walls and extending in the longitudinal direction, the inner wall having a predetermined lock teeth zone bearing a plurality of lock teeth protruding downward and arrayed in the longitudinal direction, and a free zone located adjacent to the lock teeth zone and extending in the longitudinal direction without a lock tooth, and the lock mechanism includes:

a lock plate located between the pair of side walls of the lower rail, having a plurality of engaged parts arrayed in the longitudinal direction to be engageable with the lock teeth, and being configured to move together with the upper rail over the free zone and the lock teeth zone in the longitudinal direction; and an urging member that urges the lock plate upward so that the engaged parts are engaged with the lock teeth, the lock plate having at least one pair of protrusions protruding in a width direction perpendicularly intersecting the longitudinal direction respectively from opposite side surfaces of the lock plate that face in the width direction at positions closer to the lock teeth zone on the opposite side surfaces, the sliding device further comprising: a pair of guide parts that restrict shifting of the lock plate in an up-down direction by coming into contact with the pair of protrusions, wherein the pair of guide parts are configured to, in progress of the lock plate moving from the free zone into the lock teeth zone, restrict the lock plate from shifting upward and toward the lock teeth until the lock plate reaches an engageable position where a first lock tooth that is closest to the free zone among the lock teeth is engageable with an engaged part that is closest to the free zone among the engaged parts of the lock plate, and allow the lock plate to shift upward and toward the lock teeth when the lock plate reaches the engageable position.

2. The sliding device according to claim 1, further comprising a cover that covers an outer surface of each of the pair of side walls of the lower rail over a range of corresponding one of the guide parts in the longitudinal direction.

3. The sliding device according to claim 1, wherein a length and a position of each of the guide parts are defined to allow a portion of the lock plate between the pair of protrusions to come into contact with leading ends of the lock teeth and then allow the lock plate to shift upward with an urging force of the urging member and reach a locking position where the lock teeth engage with the engaged parts, after the guide parts release the restriction.

4. The sliding device according to claim 1, wherein a width of each of the protrusions and a position of each of the guide parts in the longitudinal direction are defined to allow a portion of the lock plate between the pair of protrusions to come into contact with leading ends of the lock teeth and then allow the lock plate to shift upward with an urging force of the urging member and reach a locking position where the lock teeth engage with the engaged parts, after the guide parts release the restriction.

5. The sliding device according to claim 1, wherein each of the guide parts has a length which is equal to or longer than a portion of the engaged parts in the lock plate.

6. The sliding device according to claim 1, wherein each of the guide parts has a section extending in the longitudinal direction, and a lower surface of the section is at a height which is equal to or lower than a height of leading ends of the lock teeth.

7. The sliding device according to claim 1, wherein each of the guide parts has: a main section extending in the longitudinal direction and having a lower surface to come into contact with the protrusion; a first slope section being continuous to a first end of the main section that is closer to the free zone and sloping upward as advancing away from the main section in the longitudinal direction; and a second slope section being continuous to a second end of the main section that is closer to the lock teeth zone and sloping upward as advancing away from the main section in the longitudinal direction.

8. The sliding device according to claim 1, wherein the pair of guide parts are respectively located at portions of the pair of side walls of the lower rail, extend in the longitudinal direction, and protrude inward in the width direction of the lower rail, each of the portions of the pair of side walls corresponding to a periphery around the first lock tooth that includes a boundary between the free zone and the lock teeth zone in the longitudinal direction.

9. The sliding device according to claim 8, wherein each of the portions of the pair of side walls of the lower rail corresponding to the periphery around the first lock tooth that includes the boundary between the free zone and the lock teeth zone in the longitudinal direction has a long hole penetrating the side wall and extending in the longitudinal direction, the sliding device further comprising: a guide bracket having a plate shape and attached to a region of an outer surface of each of the pair of side walls of the lower rail, the region including the long hole in the longitudinal direction, wherein each of the guide parts constitutes a portion of the guide bracket that bends inward in the width direction of the lower rail and extends along the long hole in the longitudinal direction to be in the long hole.

10. The sliding device according to claim 8, wherein the guide parts are formed by respectively lancing the pair of side walls of the lower rail inward of the lower rail.

* * * * *